US012672186B2

(12) United States Patent
Ryu et al.

(10) Patent No.: US 12,672,186 B2
(45) Date of Patent: Jun. 30, 2026

(54) NETWORK ALLOCATION VECTOR (NAV) OPERATION IN MULTI-ACCESS POINT (AP) COORDINATION

(71) Applicant: NXP USA, Inc., Austin, TX (US)

(72) Inventors: Kiseon Ryu, San Diego, CA (US); Liwen Chu, San Ramon, CA (US); Rui Cao, Sunnyvale, CA (US); Hongyuan Zhang, Fremont, CA (US); Huizhao Wang, San Jose, CA (US)

(73) Assignee: NXP USA, Inc., Austin, TX (US)

( * ) Notice: Subject to any disclaimer, the term of this patent is extended or adjusted under 35 U.S.C. 154(b) by 310 days.

(21) Appl. No.: 18/372,908

(22) Filed: Sep. 26, 2023

(65) Prior Publication Data

US 2024/0107604 A1     Mar. 28, 2024

Related U.S. Application Data

(60) Provisional application No. 63/488,554, filed on Mar. 6, 2023, provisional application No. 63/377,193, filed on Sep. 26, 2022.

(51) Int. Cl.
*H04W 76/15*          (2018.01)

(52) U.S. Cl.
CPC ................................... *H04W 76/15* (2018.02)

(58) Field of Classification Search
CPC ............. H04W 74/08; H04W 74/0816; H04W 52/0229; H04W 84/12; H04W 28/082
See application file for complete search history.

(56) References Cited

U.S. PATENT DOCUMENTS

| | | | | |
|---|---|---|---|---|
| 10,631,334 B2 * | 4/2020 | Kim | .................. | H04W 74/08 |
| 10,712,422 B2 * | 7/2020 | Chu | .................. | G01S 5/0036 |
| 10,873,909 B1 * | 12/2020 | Chu | .................. | H04W 52/0229 |
| 11,006,416 B2 * | 5/2021 | Chu | .................. | H04L 5/0037 |

(Continued)

FOREIGN PATENT DOCUMENTS

| | | | | | |
|---|---|---|---|---|---|
| CN | 113068214 A | * | 7/2021 | ............. | H04W 24/08 |
| CN | 113068214 B | * | 3/2024 | ............. | H04W 24/08 |

(Continued)

OTHER PUBLICATIONS

Z. Stamenković, K. Tittelbach-Helmrich, M. Krstić, M. Stojčev and B. Dimitrijević, "Hardware/Software Co-Design of Wireless LAN Transceiver: A Case Study," 2019 IEEE 31st International Conference on Microelectronics (MIEL), Nis, Serbia, 2019, pp. 45-52, doi : 10.1109/MIEL.2019.8889653. (Year: 2019).*

(Continued)

*Primary Examiner* — William D Cumming

(57)          ABSTRACT

One example discloses a wireless device including: a wireless transceiver configured to receive a first frame from a first wireless access point (AP) for multi-AP coordination that is not associated with the wireless device and a second frame from a second wireless AP for multi-AP coordination that is associated with the wireless device; and a controller configured to set a network allocation vector (NAV) timer of the wireless device to a non-zero value in response to the first frame and the second frame, wherein the wireless transceiver is further configured to transmit a physical protocol data unit (PPDU) to the second wireless AP even if the NAV timer of the wireless device is non-zero.

19 Claims, 11 Drawing Sheets

(56) References Cited

U.S. PATENT DOCUMENTS

| | | | | |
|---|---|---|---|---|
| 11,265,857 | B1 * | 3/2022 | Alizadeh | H04B 7/024 |
| 11,363,657 | B1 * | 6/2022 | Chu | H04W 28/082 |
| 11,372,073 | B2 * | 6/2022 | Chu | G01S 5/0036 |
| 11,510,143 | B1 * | 11/2022 | Chu | H04W 52/0229 |
| 11,582,752 | B2 * | 2/2023 | Chu | H04L 69/323 |
| 11,601,922 | B1 * | 3/2023 | Chu | H04W 72/121 |
| 11,659,559 | B2 * | 5/2023 | Alizadeh | H04B 7/024 |
| | | | | 455/562.1 |
| 11,743,960 | B1 * | 8/2023 | Chu | H04W 76/15 |
| | | | | 370/338 |
| 11,792,829 | B2 * | 10/2023 | Chu | H04W 72/51 |
| | | | | 370/311 |
| 11,871,348 | B1 * | 1/2024 | Chu | H04W 52/0229 |
| 11,877,321 | B2 * | 1/2024 | Lu | H04W 74/0816 |
| 12,015,578 | B2 * | 6/2024 | Ouchi | H04L 5/0053 |
| 12,167,487 | B1 * | 12/2024 | Chu | H04W 28/082 |
| 12,192,819 | B2 * | 1/2025 | Kim | H04W 74/00 |
| 12,262,411 | B2 * | 3/2025 | Ajami | H04W 74/0816 |
| 12,382,394 | B1 * | 8/2025 | Chu | H04W 52/0229 |
| 2018/0213558 | A1 * | 7/2018 | Kim | H04W 74/08 |
| 2019/0238261 | A1 * | 8/2019 | Chu | H04L 1/0011 |
| 2019/0239226 | A1 * | 8/2019 | Chu | H04L 5/0037 |
| 2020/0319287 | A1 * | 10/2020 | Chu | G01S 5/0036 |
| 2021/0212118 | A1 * | 7/2021 | Lu | H04W 74/0816 |
| 2021/0235449 | A1 * | 7/2021 | Chu | H04W 84/12 |
| 2021/0266891 | A1 * | 8/2021 | Chu | H04L 5/1469 |
| 2022/0225325 | A1 * | 7/2022 | Alizadeh | H04B 7/024 |
| 2022/0264566 | A1 * | 8/2022 | Chu | H04W 72/0446 |
| 2023/0180201 | A1 * | 6/2023 | Chu | H04W 74/06 |
| | | | | 370/329 |
| 2024/0107604 | A1 * | 3/2024 | Ryu | H04W 76/15 |
| 2024/0237109 | A1 * | 7/2024 | Huang | H04W 72/27 |
| 2024/0251282 | A1 * | 7/2024 | Kim | H04L 69/14 |
| 2024/0306194 | A1 * | 9/2024 | Ryu | H04W 74/08 |
| 2024/0365383 | A1 * | 10/2024 | Chu | H04W 74/0866 |
| 2025/0142399 | A1 * | 5/2025 | Kim | H04W 76/15 |
| 2025/0287329 | A1 * | 9/2025 | Fang | H04W 56/001 |
| 2025/0301495 | A1 * | 9/2025 | Fang | H04L 5/0053 |

FOREIGN PATENT DOCUMENTS

| | | | | | |
|---|---|---|---|---|---|
| EP | 3846574 | A1 * | 7/2021 | | H04W 24/08 |
| EP | 3846574 | B1 * | 10/2023 | | H04W 24/08 |
| EP | 4412297 | A1 * | 8/2024 | | H04L 69/14 |
| JP | 2024532781 | A * | 9/2024 | | H04W 76/15 |
| KR | 20240027841 | A * | 3/2024 | | H04W 76/15 |
| KR | 20240090259 | A * | 6/2024 | | H04L 69/14 |
| TW | 202130219 | A * | 8/2021 | | H04W 76/15 |
| TW | 1789667 | B * | 1/2023 | | H04W 24/08 |
| TW | I789667 | B * | 1/2023 | | H04W 24/08 |
| WO | WO-2017213391 | A1 * | 12/2017 | | H04W 74/00 |
| WO | WO-2019147319 | A1 * | 8/2019 | | G01S 5/14 |
| WO | WO-2019152564 | A1 * | 8/2019 | | H04L 69/323 |

OTHER PUBLICATIONS

Sun, Yuanjun et al. "Considerations on Coordinated TDMA (C-TDMA)", IEEE 802.11-23/0041r0, Jan. 2023, 14 pgs.

Chu, Liwen et al. "Extended TXOP Sharing", IEEE 802.11-23/0249r1, Jan. 10, 2023, 12, pgs.

Das, Dibakar et al. "C-TDMA procedure in UHR", IEEE 802.11-23/261r0, Jan. 25, 2023, 8 pgs.

Sun, Yanjun et al. "Follow-up on Coordinated TDMA (C-TDMA)", IEEE 802.11-23/0739r1, May 15, 2023, 9 pgs.

Kim Geonhwan et al. "Thoughts on Coordinated TDMA", Aug. 7, 2023, 11 pgs.

Noh, Si-Chan et al. "Considerations on Return TXOP between multiple APs", Aug. 7, 2023, 11 pgs.

IEEE, "Amendment 1: Enhancements for High-Efficiency WLAN", IEEE Standard for Information Technology—Telecommunications and Information Exchange between Systems Local and Metropolitan Area Networks—Specific Requirements Part 11: Wireless LAN Medium Access Control (MAC) and Physical Layer (PHY) Specifications, IEEE Std 802.11ax™ (2021), 767 pgs.

* cited by examiner

MULTI-AP COORDINATION SYSTEM
100

FIG. 6

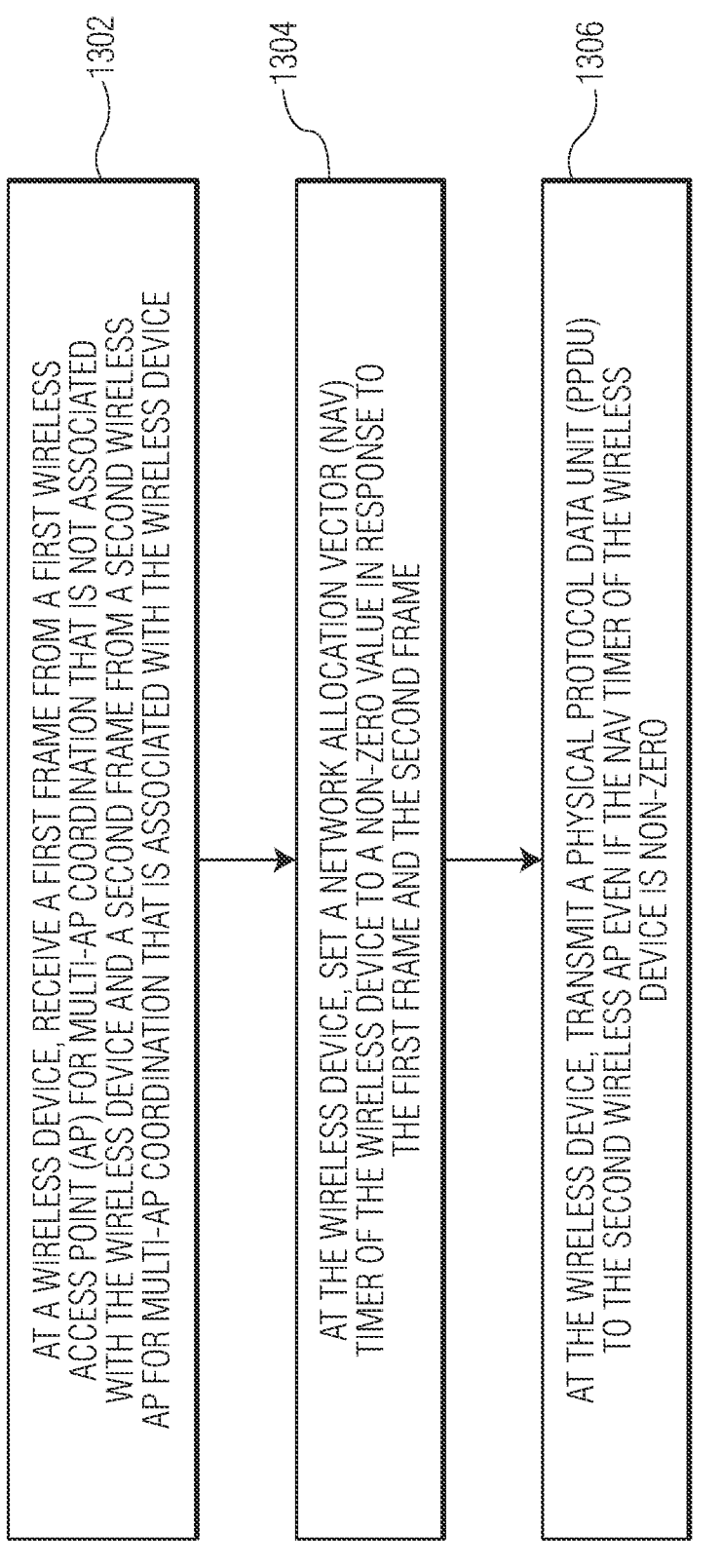

AT A WIRELESS DEVICE, RECEIVE A FIRST FRAME FROM A FIRST WIRELESS ACCESS POINT (AP) FOR MULTI-AP COORDINATION THAT IS NOT ASSOCIATED WITH THE WIRELESS DEVICE AND A SECOND FRAME FROM A SECOND WIRELESS AP FOR MULTI-AP COORDINATION THAT IS ASSOCIATED WITH THE WIRELESS DEVICE

1302

AT THE WIRELESS DEVICE, SET A NETWORK ALLOCATION VECTOR (NAV) TIMER OF THE WIRELESS DEVICE TO A NON-ZERO VALUE IN RESPONSE TO THE FIRST FRAME AND THE SECOND FRAME

1304

AT THE WIRELESS DEVICE, TRANSMIT A PHYSICAL PROTOCOL DATA UNIT (PPDU) TO THE SECOND WIRELESS AP EVEN IF THE NAV TIMER OF THE WIRELESS DEVICE IS NON-ZERO

NETWORK ALLOCATION VECTOR (NAV) OPERATION IN MULTI-ACCESS POINT (AP) COORDINATION

CROSS-REFERENCE TO RELATED APPLICATIONS

This application is entitled to the benefit of U.S. Provisional Patent Application Ser. No. 63/377,193, filed on Sep. 26, 2022, and U.S. Provisional Patent Application Ser. No. 63/488,554, filed on Mar. 6, 2023, each of which is incorporated by reference herein.

BACKGROUND

Wireless communications devices, e.g., access points (APs) or non-AP devices can transmit various types of information using different transmission techniques. For example, various applications, such as, Internet of Things (IoT) applications can conduct wireless local area network (WLAN) communications, for example, based on Institute of Electrical and Electronics Engineers (IEEE) 802.11 family of standards (e.g., Wi-Fi standards). Multi-AP coordination can allow multiple wireless APs in a multi-AP coordination system to communicate in a coordinated manner. However, typical carrier sense techniques can hinder data transmission within a multi-AP coordination system.

SUMMARY

Embodiments of a method and apparatus for wireless communications are disclosed. In an embodiment, a wireless device includes a wireless transceiver configured to receive a first frame from a first wireless AP for multi-AP coordination that is not associated with the wireless device and a second frame from a second wireless AP for multi-AP coordination that is associated with the wireless device and a controller configured to set a network allocation vector (NAV) timer of the wireless device to a non-zero value in response to the first frame and the second frame. The wireless transceiver is further configured to transmit a physical protocol data unit (PPDU) to the second wireless AP even if the NAV timer of the wireless device is non-zero. Other embodiments are also disclosed.

In an embodiment, the PPDU includes a trigger based (TB) PPDU.

In an embodiment, the PPDU includes a non-trigger based (TB) PPDU.

In an embodiment, the wireless device includes a non-AP station (STA) device.

In an embodiment, the second wireless AP shares a transmit opportunity (TXOP) of the first wireless AP.

In an embodiment, the controller is further configured to identify the first frame as an intra-basic service set (BSS) PPDU and to update an intra-BSS NAV timer of the wireless device in response to the intra-BSS PPDU.

In an embodiment, the first wireless AP, the second wireless AP, and the wireless device belong to the same BSS.

In an embodiment, the first wireless AP and the wireless device belong to different BSSs, and the second wireless AP and the wireless device belong to the same BSS.

In an embodiment, the wireless transceiver is further configured to receive BSS information of a plurality of wireless APs for multi-AP coordination.

In an embodiment, the first frame includes a multi-AP control frame that includes an indication of intra-BSS NAV timer update of the wireless device upon reception of the multi-AP control frame.

In an embodiment, the multi-AP control frame includes a Multi User Request to Send (MU-RTS) triggered TXOP sharing (TXS) frame.

In an embodiment, the second frame includes a trigger frame that contains a carrier sense (CS) required subfield that is set to zero.

In an embodiment, the wireless device is compatible with an Institute of Electrical and Electronics Engineers (IEEE) 802.11 protocol.

In an embodiment, a method for wireless communications involves at a wireless device, receiving a first frame from a first wireless AP for multi-AP coordination that is not associated with the wireless device and a second frame from a second wireless AP for multi-AP coordination that is associated with the wireless device, at the wireless device, setting a NAV timer of the wireless device to a non-zero value in response to the first frame and the second frame, and from the wireless device, transmitting a PPDU to the second wireless AP even if the NAV timer of the wireless device is non-zero.

In an embodiment, the PPDU includes a trigger based (TB) PPDU.

In an embodiment, the PPDU includes a non-TB PPDU.

In an embodiment, the second wireless AP shares a TXOP of the first wireless AP.

In an embodiment, the method further involves identifying the first frame as an intra-BSS PPDU and updating an intra-BSS NAV timer of the wireless device in response to the intra-BSS PPDU.

In an embodiment, the first wireless AP and the second wireless AP belong to different BSSs.

In an embodiment, a non-AP STA device compatible with an IEEE 802.11 protocol includes a wireless transceiver configured to receive a first frame from a first wireless AP for multi-AP coordination that is not associated with the non-AP STA device and a second frame from a second wireless AP for multi-AP coordination that is associated with the non-AP STA device and a controller configured to set a NA) timer of the non-AP STA device to a non-zero value in response to the first frame and the second frame. The second wireless AP shares a TXOP of the first wireless AP. The wireless transceiver is further configured to transmit a trigger based (TB) PPDU to the second wireless AP even if the NAV timer of the non-AP STA device is non-zero.

BRIEF DESCRIPTION OF THE DRAWINGS

FIG. 6 depicts a frame exchange sequence diagram in a multi-AP coordination system.

FIG. 13 is a process flow diagram of a method for wireless communications in accordance with an embodiment of the invention.

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
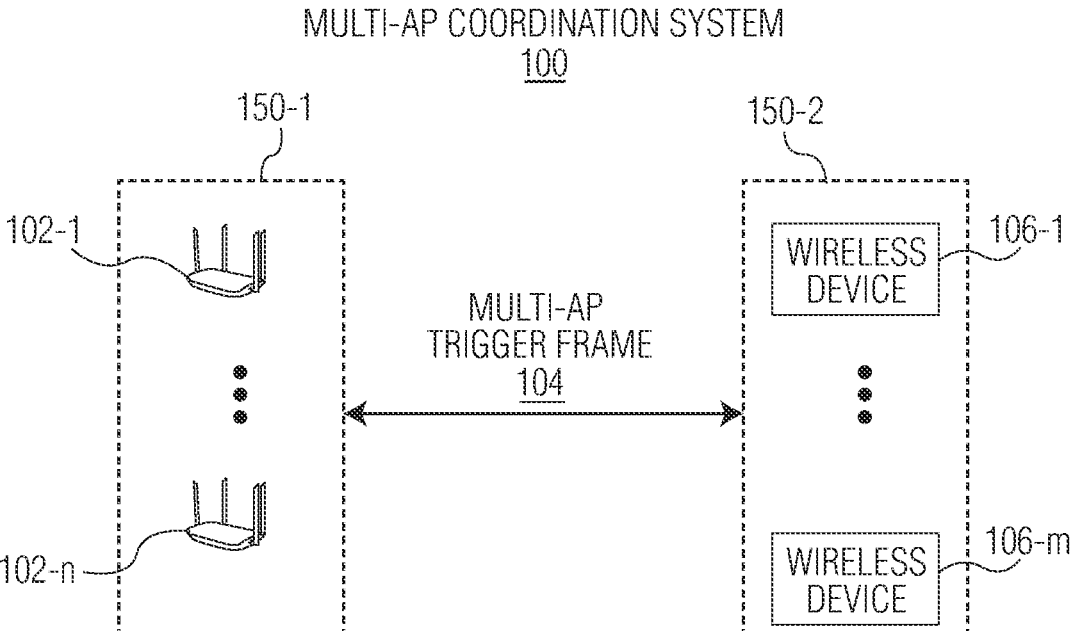
FIG. 1 depicts a multi-AP coordination system in accordance with an embodiment of the invention.

FIG. 1 depicts a multi-AP coordination system 100 in accordance with an embodiment of the invention. In the embodiment depicted in FIG. 1, the multi-AP coordination system 100 includes multiple wireless APs 102-1, . . . , 102-n, where n is a positive integer that is greater than one, and one or more non-AP stations (STAs) 106-1, . . . , 106-m, where n is a positive integer. The multi-AP coordination system can be used in various applications, such as industrial applications, medical applications, computer applications, and/or consumer or enterprise applications. In some embodiments, the multi-AP coordination system (e.g., at least one of the wireless APs 102-1, . . . , 102-n and/or the non-AP STAs 106-1, . . . , 106-m) is compatible with an IEEE 802.11 protocol. Although the depicted multi-AP coordination system 100 is shown in FIG. 1 with certain components and described with certain functionality herein, other embodiments of the multi-AP coordination system may include fewer or more components to implement the same, less, or more functionality. For example, in some embodiments, the multi-AP coordination system includes multiple wireless APs with one non-AP STA or multiple wireless APs with multiple non-AP STAs. In another example, although the multi-AP coordination system is shown in FIG. 1 as being connected in a certain topology, the network topology of the multi-AP coordination system is not limited to the topology shown in FIG. 1. In some embodiments, the multi-AP coordination system 100 described with reference to FIG. 1 involves single-link communications and the wireless APs 102-1, . . . , 102-n and the non-AP STAs 106-1, . . . , 106-m communicate through single communications links. In some embodiments, the multi-AP coordination system 100 described with reference to FIG. 1 involves multi-link communications and the wireless APs 102-1, . . . , 102-n and the non-AP STAs 106-1, . . . , 106-m communicate through multiple communications links. Furthermore, the techniques described herein may also be applicable to each link of a multi-link communications system.

In the embodiment depicted in FIG. 1, at least one of the wireless APs 102-1, . . . , 102-n may be implemented in hardware (e.g., circuits), software, firmware, or a combination thereof. For example, at least one of the wireless APs 102-1, . . . , 102-n may be fully or partially implemented as an integrated circuit (IC) device. In some embodiments, at least one of the wireless APs 102-1, . . . , 102-n is a wireless access point (AP) compatible with at least one WLAN communications protocol (e.g., at least one IEEE 802.11 protocol). In some embodiments, at least one of the wireless APs 102-1, . . . , 102-n is a wireless AP that connects to a local area network (LAN) and/or to a backbone network (e.g., the Internet) through a wired connection and that wirelessly connects to one or more wireless stations (STAs), for example, through one or more WLAN communications protocols, such as an IEEE 802.11 protocol. In some embodiments, a wireless AP 102-1, . . . , or 102-n includes at least one antenna, at least one transceiver operably connected to the at least one antenna, and at least one controller operably connected to the corresponding transceiver. In some embodiments, the transceiver includes a physical layer (PHY) device. The controller may be configured to control the transceiver to process received packets through the antenna. In some embodiments, the controller is implemented within a processor, such as a microcontroller, a host processor, a host, a digital signal processor (DSP), or a central processing unit (CPU), which can be integrated in a corresponding transceiver. In some embodiments, a wireless AP 102-1, . . . , or 102-n (e.g., a controller or a transceiver of the wireless AP 102-1, . . . , or 102-n) implements upper layer Media Access Control (MAC) functionalities (e.g., beacon acknowledgement establishment, reordering of frames, etc.) and/or lower layer MAC functionalities (e.g., backoff, frame transmission, frame reception, etc.). In some embodiments, the wireless APs 102-1, . . . , 102-n may operate in different frequency bands.

For example, one wireless AP may operate in a 2.4 gigahertz (GHz) frequency band and another wireless AP may operate in a 5 GHz frequency band.

In the embodiment depicted in FIG. 1, at least one non-AP STA 106-1, . . . , or 106-*m* may be implemented in hardware (e.g., circuits), software, firmware, or a combination thereof. For example, at least one non-AP STA 106-1, . . . , or 106-*m* may be fully or partially implemented as IC devices. In some embodiments, at least one non-AP STA 106-1, . . . , or 106-*m* is a communications device compatible with at least one IEEE 802.11 protocol. In some embodiments, at least one non-AP STA 106-1, . . . , or 106-*m* is implemented in a laptop, a desktop personal computer (PC), a mobile phone, or other communications device that supports at least one WLAN communications protocol. In some embodiments, at least one non-AP STA 106-1, . . . , or 106-*m* implements a common MAC data service interface and a lower layer MAC data service interface. In some embodiments, at least one non-AP STA 106-1, . . . , or 106-*m* includes at least one antenna, at least one transceiver operably connected to the at least one antenna, and at least one controller connected to the corresponding transceiver. In some embodiments, the transceiver includes a PHY device. The controller may be configured to control the transceiver to process received packets through the antenna. In some embodiments, the controller is implemented within a processor, such as a microcontroller, a host processor, a host, a DSP, or a CPU, which can be integrated in a corresponding transceiver.

In the embodiment depicted in FIG. 1, the wireless APs 102-1, . . . , 102-*n* form a network 150-1 and the one or more non-AP STAs 106-1, . . . , 106-*m* form a network 150-2. The wireless APs 102-1, . . . , 102-*n* may reside in the same basic service set (BSS) or in different BSSs. In the embodiment depicted in FIG. 1, one of the wireless APs 102-1, . . . , 102-*n* is associated with at least one of the one or more non-AP STAs 106-1, . . . , 106-*m*. In some embodiments, a non-AP STA is associated with a specific wireless AP when the non-AP STA is authenticated with the specific wireless AP and is linked to the specific wireless AP such that the specific wireless AP can properly route traffic to and/or from the non-AP STA. In some embodiments, a STA can only associate with one wireless AP at a time. In some embodiments, once the authentication between a non-AP STA and a specific wireless AP is complete, the non-AP STA associates or registers with the specific wireless AP to allow the specific wireless AP to record each STA such that frames can be properly delivered to associated STAs or received from associated STAs. In some embodiments, a non-AP STA sends an association request to a specific wireless AP, and the specific wireless AP processes the association request. For example, when the specific wireless AP grants association, the specific wireless AP responds with a status code of 0 (successful) and the Association ID (AID), which can be used to identify the non-AP STA. For example, one of the wireless APs 102-1, . . . , 102-*n* and at least one of the one or more non-AP STAs 106-1, . . . , 106-*m* reside in the same BSS. Multi-AP coordination can allow the wireless APs 102-1, . . . , 102-*n* in the multi-AP coordination system 100 to communicate in a coordinated manner. In the embodiment depicted in FIG. 1, the wireless APs 102-1, . . . , 102-*n* may transmit a multi-AP trigger frame 104 to the one or more non-AP STAs 106-1, . . . , 106-*m* to initiate multi-AP coordinated communications. Multi-AP coordination feature may be one of candidate technology in next generation WLAN standard (e.g., Ultra-High Reliability Study Group and Task Group bn in IEEE 802.11). Types of multi-AP coordination may include multi-AP Coordinated Time Division Multiple Access (TDMA) (C-TDMA), multi-AP Coordinated orthogonal frequency-division multiple access (OFDMA) (C-OFDMA), multi-AP Coordinated Beamforming (C-BF), and multi-AP Joint Transmission (J-TX). In some embodiments, in multi-AP Coordinated TDMA (C-TDMA), multiple wireless APs transmit on coordinated time resources by, for example, coordinating and splitting a time period (e.g., one transmit opportunity (TXOP)) to mitigate interference between each other. In some embodiments, in multi-AP Coordinated OFDMA (C-OFDMA), multiple wireless APs transmit on orthogonal frequency resources by, for example, coordinating and splitting the spectrum to utilize it more efficiently. In some embodiments, in multi-AP Coordinated Beamforming (C-BF), multiple wireless APs transmit on the same frequency resource by, for example, coordinating and forming spatial nulls to allow for simultaneous transmissions from multiple wireless APs. In some embodiments, in multi-AP Joint Transmission (J-TX), multiple wireless APs transmit jointly to a given user. In some embodiments, an Ultra-High Reliability (UHR) wireless AP, which obtains a TXOP and initiates the multi-AP coordination, is the sharing AP, and a UHR wireless AP, which is coordinated for the multi-AP transmission by the sharing AP, is the shared AP.

Figure 2:
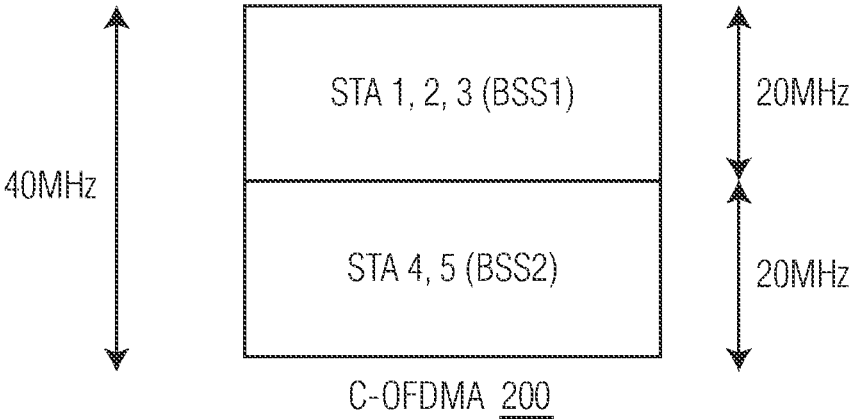
FIG. 2 depicts a multi-AP Coordinated orthogonal frequency-division multiple access (OFDMA) (C-OFDMA) configuration.

FIG. 2 depicts a multi-AP Coordinated OFDMA (C-OFDMA) configuration 200. As depicted in FIG. 2, STAs 1, 2, 3 are in a first basic service set (BSS) BSS1 with a frequency band of 20 Megahertz (MHz), while STAs 4, 5 are in a second BSS BSS2 with a frequency band of 20 MHz. Multiple wireless APs may transmit on orthogonal frequency resources by, for example, coordinating and splitting the spectrum to utilize it more efficiently.

Figure 3:
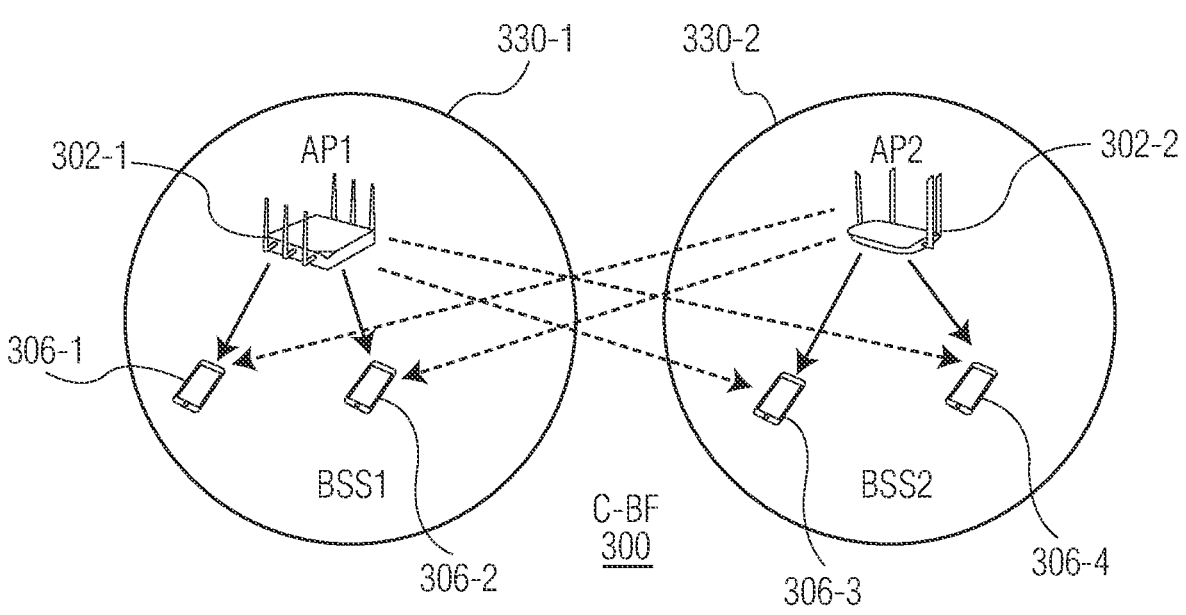
FIG. 3 depicts a multi-AP Coordinated Beamforming (C-BF) configuration.

FIG. 3 depicts a multi-AP Coordinated Beamforming (C-BF) configuration 300. As depicted in FIG. 3, a wireless AP 302-1 and two STAs 306-1, 306-2 are located in a first BSS 330-1, while a wireless AP 302-2 and two STAs 306-3, 306-4 are located in a second BSS 330-2. The wireless APs 302-1, 302-2 may transmit on the same frequency resource by, for example, coordinating and forming spatial nulls to allow for simultaneous transmissions from the wireless APs 302-1, 302-2.

Figure 4:
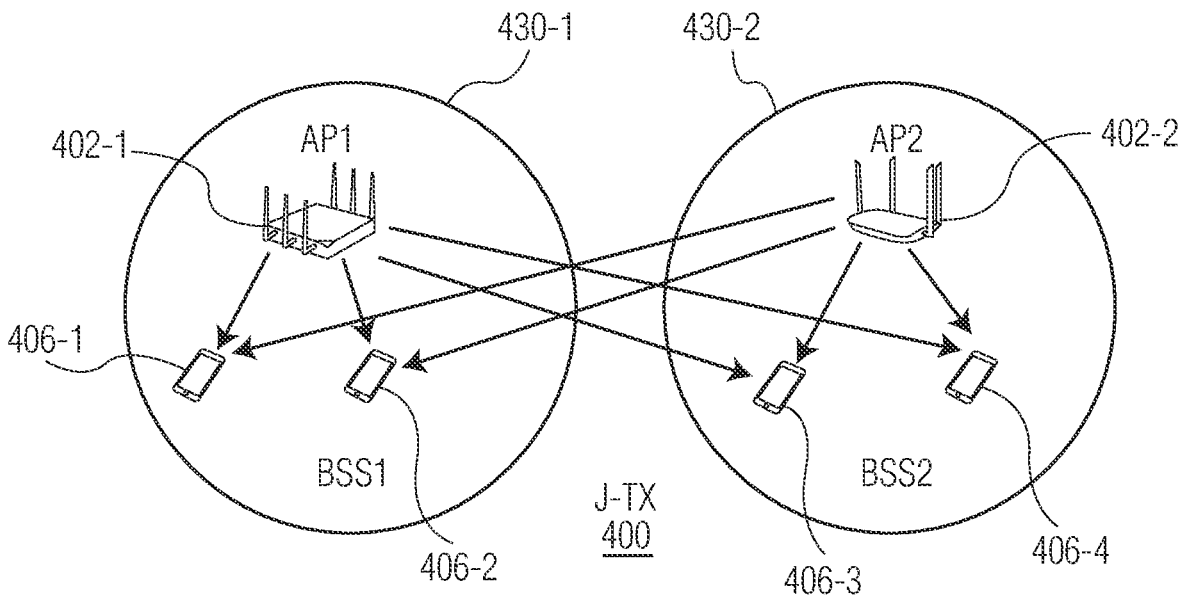
FIG. 4 depicts a multi-AP Joint Transmission (J-TX) configuration.

FIG. 4 depicts a multi-AP Joint Transmission (J-TX) configuration 400. As depicted in FIG. 4, a wireless AP 402-1 and two STAs 406-1, 406-2 are located in a first BSS 430-1, while a wireless AP 402-2 and two STAs 406-3, 406-4 are located in a second BSS 430-2. The wireless APs 402-1, 402-2 may transmit jointly to a given user.

Figure 5:
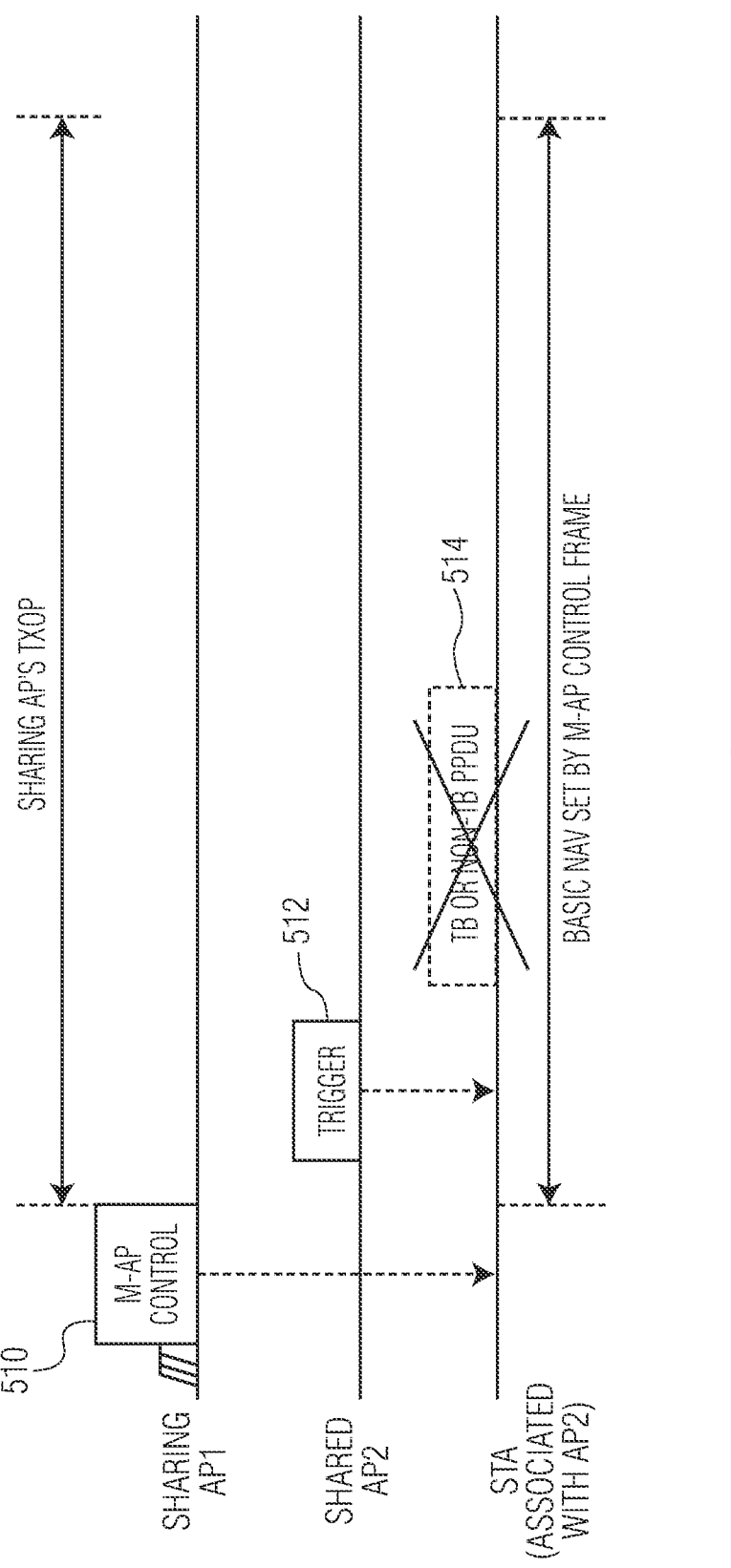
FIG. 5 depicts a frame exchange sequence diagram in a multi-AP coordination system.

FIG. 5 depicts a frame exchange sequence diagram in a multi-AP coordination system. In the frame exchange sequence diagram depicted in FIG. 5, the multi-AP coordination system involves a sharing AP (referred to as AP1), at least one shared AP (referred to as AP2), and a non-AP STA that is associated with the shared AP. In some embodiments, an Ultra High Reliability (UHR) AP, which obtains a TXOP and initiates per-TXOP multi-AP coordination, is the sharing AP, while a UHR AP, which is coordinated for per-TXOP multi-AP transmission by the sharing AP, is the shared AP. In the multi-AP coordination system, the sharing AP1 obtains a transmit opportunity (TXOP) and initiates the multi-AP coordination, and the shared AP2 is coordinated for the multi-AP transmission by the sharing AP1. The sharing AP1 and/or the shared AP2 may be implemented the same as or similar to the wireless APs 102-1, . . . , 102-*n* depicted in FIG. 1, while the non-AP STA may be implemented the same as or similar to the non-AP STAs 106-1, . . . , 106-*m* depicted in FIG. 1, respectively. In the frame exchange sequence diagram depicted in FIG. 5, the sharing AP1 obtains a TXOP and transmits a multiple-AP (M-AP) control frame 510 coordinating multi-AP transmission to one or more shared AP(s) belonging to the same multi-AP coordination system or group. Upon receiving the frame, the shared AP(s) perform multi-AP transmission using, such as, coordinated TDMA (C-TDMA), coordinated OFDMA (C-OFDMA), coordinated beamforming (C-BF) and/or joint transmission, etc. In the frame exchange sequence diagram depicted in FIG. 5, a trigger frame 512 may be sent by the shared AP2 to the non-AP STA. The sharing AP1 and the shared AP(s) may have a different basic service set identifier (BSSID) and a different BSS color. In this case, a target scheduled non-AP STA for multi-AP coordinated transmission can identify a frame received from the sharing AP1 and/or a shared AP that is not associated with the non-AP STA as an inter-BSS physical layer protocol data unit (PPDU), which causes a basic Network Allocation Vector (NAV) timer of the non-AP STA being set to a non-zero value. In some embodiments, the NAV may be a counter, which counts down to zero at a uniform rate. When the counter is zero, the virtual carrier-sensing indication is that the medium is idle, and when the counter is nonzero, the virtual carrier-sensing indication is that the medium is busy. The basic NAV timer being set to a non-zero value may prevent the target scheduled non-AP STA from transmitting a trigger-based PPDU to the shared AP2 that is associated with the non-AP STA (e.g., for the case of trigger-based uplink transmission, etc.).

In some embodiments, in order to prevent a non-AP STA from not transmitting a trigger-based (TB) PPDU due to a non-zero basic NAV set by a frame sent from a BSS belonging to the same multi-AP coordination group, the frame is identified at the non-AP STA as an intra-BSS PPDU. In a first option, the same BSSID and BSS color are assigned to BSSs and/or wireless APs belonging to the same multi-AP coordination group. In a second option, different BSSID and BSS color are assigned to BSSs and/or wireless APs belonging to the same multi-AP coordination group. For example, a shared AP announces the BSSIDs and BSS colors of other APs belonging to the same multi-AP coordination group and a frame received from a BSS belonging to the same multi-AP coordination group is considered as an intra-BSS PPDU. In a third option, intra-BSS NAV update indication is included in a multi-AP control frame.

In some embodiments, basic service set (BSS) color is an identifier for a BSS or for a set of BSSs belonging to a multiple basic service set identifier (BSSID) set or a co-hosted BSSID set. In some embodiments, BSS color identifies a BSS and assists a STA receiving a PPDU that carries BSS color in identifying the BSS from which the PPDU originates such that the STA can use the channel access rules (High-Efficiency (HE) spatial reuse operation), reduce power consumption (Intra-PPDU power save for non-AP HE STAs), or update its NAV (Updating two NAVs). In some embodiments, all APs that are members of a multiple BSSID set or co-hosted BSSID set use the same BSS color.

In some embodiments, intra-BSS and inter-BSS PPDU classification is described as follows. In some embodiments, a STA classifies a received PPDU as an inter-BSS PPDU if at least one of the following conditions is true:

(1), the BSS color is not disabled and the RXVECTOR parameter BSS_COLOR is not 0 and is not the BSS color of the BSS of which the STA is a member;

(2), the PPDU carries a frame that has a BSSID field, the value of which is not the BSSID of the BSS in which the STA is associated or any of the other BSSs in the same multiple BSSID set or co-hosted BSSID set to which its BSS belongs or the wildcard BSSID; or (3), the PPDU carries a frame that does not have a BSSID field but has both a receiver address (RA) field and a transmitter address (TA) field, neither value of which is equal to the BSSID of the BSS in which the STA is associated or any of the other BSSs in the same multiple BSSID set or co-hosted BSSID set to which its BSS belongs. The Individual/Group bit in the TA field value may be forced to 0 prior to comparison. In some embodiments, a STA classifies the received PPDU as an intra-BSS PPDU if at least one of the following conditions is true:

(1), the BSS color is not disabled and the RXVECTOR parameter BSS_COLOR is the BSS color of the BSS of which the STA is a member or the BSS color of any Tunneled Direct Link Setup (TDLS) links to which the STA belongs if the STA is an HE STA associated with a non-HE AP; or (2) the PPDU carries a frame that has an RA, TA, or BSSID field value that is equal to the BSSID of the BSS or the BSSID of any BSS in which the STA is associated or any of the other BSSs in the same multiple BSSID set or co-hosted BSSID set to which its BSS belongs. The Individual/Group bit in the TA field value may be forced to the value 0 prior to the comparison.

In some embodiments, a network device (e.g., a non-AP STA) maintains an intra-BSS NAV and a basic NAV. In some embodiments, a non-AP HE STA maintains two NAVs, and an HE AP may maintain two NAVs. In some embodiments, the intra-BSS NAV is updated by an intra-BSS PPDU. In some embodiments, the basic NAV is updated by an inter-BSS PPDU or a PPDU that cannot be classified as intra-BSS or inter-BSS. Maintaining two NAVs may be beneficial in dense deployment scenarios in which a STA requires protection from frames transmitted by STAs within its BSS, i.e., intra-BSS, and wants to avoid interference from frames transmitted by STAs in a neighboring BSS, i.e., inter-BSS. For example, in a TXOP initiated by an AP with which a STA is associated for an HE TB PPDU transmission, the intra-BSS NAV of the STA is set by the AP to prevent the STA from contending for the channel. In some embodiments, the basic NAV of the STA is not updated by transmissions from the AP during the TXOP such that if the basic NAV of the STA is nonzero and the STA receives, from the AP, a trigger frame with the Carrier Sense (CS) Required subfield equal to 1, the STA will not respond. In some embodiments, a STA that is not a TXOP holder updates the intra-BSS NAV with the duration information indicated by the RXVECTOR parameter TXOP_DURATION for an HE PPDU if and only if all the following conditions are met:

(1), The RXVECTOR parameter TXOP_DURATION is not unspecified;

(2), the PPDU that carried information of the RXVECTOR parameter is identified as intra-BSS according to intra-BSS and inter-BSS PPDU classification;

(3), the STA does not receive a frame with a duration field in the PPDU; and (4), the duration information indicated by the RXVECTOR parameter TXOP_DURATION is greater than the current intra-BSS NAV of the STA. In some embodiments, a STA updates the basic NAV with the duration information indicated by the RXVECTOR parameter TXOP_DURATION for an HE PPDU if and only if all the following conditions are met:

(1), the RXVECTOR parameter TXOP_DURATION is not unspecified;

(2), the PPDU that carried information for the RXVEC-
TOR parameter is identified as inter-BSS or cannot be
identified as intra-BSS or inter-BSS according to intra-
BSS and inter-BSS PPDU classification;

(3), the STA does not receive a frame with a duration field
in the PPDU; and (4), the duration information indicated by the RXVEC-
TOR parameter TXOP_DURATION is greater than the
current basic NAV of the STA.

In some embodiments, in order to prevent a non-AP STA
from not transmitting a TB PPDU due to a non-zero basic
NAV set by a frame sent from a BSS belonging to the same
multi-AP coordination group, the Carrier Sense (CS)
required subfield is set to 0 in a trigger frame during
multi-AP coordinated transmission. For example, in multi-
AP coordinated TDMA, the CS required subfield in a trigger
frame transmitted by a shared AP is set to 0 such that a
non-AP STA can transmit a TB PPDU. In some embodi-
ments, in order to not interfere with other on-going trans-
mission, a sharing AP that has the TXOP performs the
multi-AP coordinated transmission by exchanging a Multi
User Request to Send (MU-RTS)/Clear to Send (CTS) or an
RTS/CTS.

In some embodiments, a non-AP STA does not consider
the intra-BSS NAV in determining whether to respond to a
trigger frame sent by an AP with which the non-AP STA is
associated. A non-AP STA may consider the basic NAV in
determining whether to respond to a trigger frame sent by
the AP with which the non-AP STA is associated. In some
embodiments, if the CS required subfield in a trigger frame
is 1, the non-AP STA considers the status of the Clear
Channel Assessment (CCA) and the virtual carrier sense
(NAV) during the Short Interframe Spacing (SIFS) between
the trigger frame and the PPDU sent in response to the
trigger frame. In this case, the non-AP STA may sense the
medium using energy detect after receiving the PPDU that
contains the trigger frame (i.e., during the SIFS), and may
perform the energy detect at least in the subchannel that
contains the non-AP STA's uplink (UL) allocation, where
the sensed subchannel consists of one or more 20 MHz
channels. The non-AP STA may transmit the solicited PPDU
if the 20 MHz channels containing the Resource Units (RUs)
allocated in the trigger frame are considered idle. In some
embodiments, if the non-AP STA detects that the 20 MHz
channels containing the allocated RUs are not all idle, the
non-AP STA does not transmit data. In some embodiments,
if the CS Required subfield in a received Trigger frame is 0
or a frame that includes a Triggered Response Scheduling
(TRS) control subfield and solicits a response is received,
the non-AP STA may respond without regard to the busy/
idle state of the medium.

In some embodiments, in order to prevent a non-AP STA
from not transmitting a TB PPDU due to a non-zero basic
NAV set by a frame sent from a BSS belonging to the same
multi-AP coordination group, multi-AP coordinated trans-
mission is used only for downlink (DL) frame transmission
applicable, for example, only to DL C-OFDMA/C-TDMA,
not to UL C-OFDMA/C-TDMA. A non-AP STA may be able
to identify the frame received from other BSS belonging to
the same multi-AP coordination group as an inter-BSS
PPDU, unless UL C-OFDMA/C-TDMA is used during the
TXOP.

Figure 6:
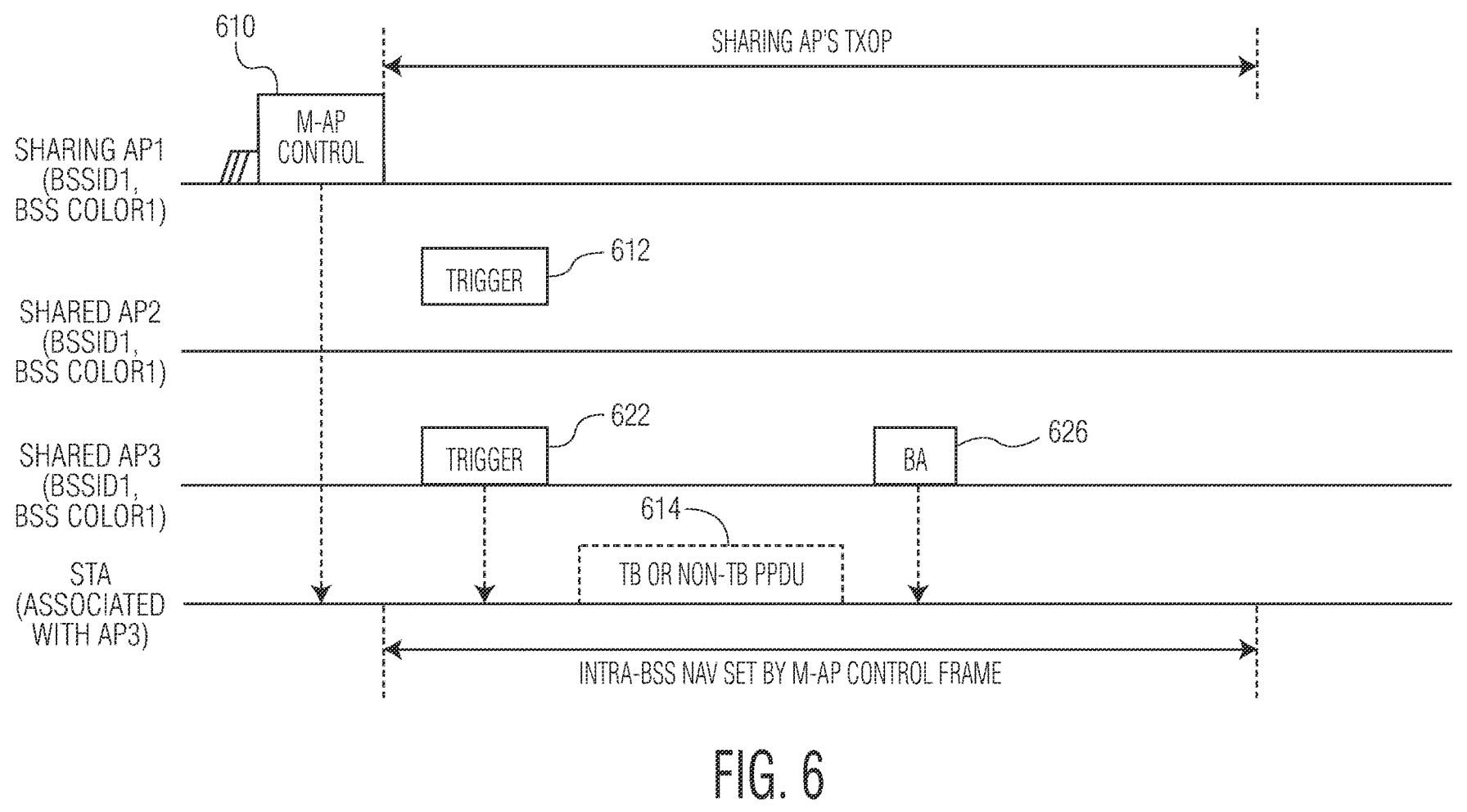

FIG. 6 depicts a frame exchange sequence diagram in a
multi-AP coordination system. In the frame exchange
sequence diagram depicted in FIG. 6, the multi-AP coordi-
nation system involves a sharing AP (referred to as AP1)
with BSSID1 and BSS color 1, a shared AP (referred to as AP2) with BSSID1 and BSS color 1, a shared AP (referred
to as AP3) with BSSID1 and BSS color 1, and a non-AP STA
that is associated with the shared AP3. In the multi-AP
coordination system, the sharing AP1 obtains a transmit
opportunity (TXOP) and initiates the multi-AP coordination,
and the shared AP2, AP3 are coordinated for the multi-AP
transmission by the sharing AP1. The sharing AP1 and/or the
shared AP2, AP3 may be implemented the same as or similar
to the wireless APs 102-1, . . . , 102-n depicted in FIG. 1,
while the non-AP STA may be implemented the same as or
similar to the non-AP STAs 106-1, . . . , 106-m depicted in
FIG. 1, respectively. In order to prevent a non-AP STA from
not transmitting a TB PPDU due to a non-zero NAV set by
a frame sent from a BSS belonging to the same multi-AP
coordination group, the frame is identified at the non-AP
STA as an intra-BSS PPDU. In the embodiment depicted in
FIG. 6, the same BSSID and BSS color are assigned to BSSs
and APs belong to the same multi-AP coordination group.
All the APs AP1, AP2, AP3 belonging to the same multi-AP
coordination group transmit frames indicating the same
BSSID and/or BSS color, which is simple and appropriate to
the case of the group of multi-AP coordination is managed
based on long-term and is rarely changed. Multi-AP coor-
dination group can be managed with different level of
groups, such as dynamic group and static group based on an
AP's capabilities and the group of non-AP STAs, which can
be served for multi-AP coordination feature. In this case, it
may not be easy to update the BSSID and BSS color of
multiple APs appropriately when the multi-AP group is
updated dynamically. In some embodiments, APs in a multi-
AP coordination group may have the same BSS color, but
different BSSIDs. In this case, non-AP STAs might consider
only BSS color to determine whether the received frame is
either an intra-BSS frame or an inter-BSS frame. In the
frame exchange sequence diagram depicted in FIG. 6, the
sharing AP1 obtains a TXOP and transmits a multiple-AP
(M-AP) control frame 610 coordinating multi-AP transmis-
sion to the shared AP2, AP3 belonging to the same multi-AP
coordination system or group. Upon receiving the frame, the
shared AP2, AP3 perform multi-AP transmission using, such
as, coordinated TDMA (C-TDMA), coordinated OFDMA
(C-OFDMA), coordinated beamforming (C-BF) and/or joint
transmission, etc. In the frame exchange sequence diagram
depicted in FIG. 6, a trigger frame 612 may be sent by the
shared AP2 to the non-AP STA and a trigger frame 622 may
be sent by the shared AP3 to the non-AP STA. The intra-BSS
NAV of the non-AP STA is set by the multi-AP control frame
610. A TB or non-TB PPDU 614 may be sent by the non-AP
STA, and a block acknowledgement (BA) 626 may be sent
by the shared AP3.

Figure 7:
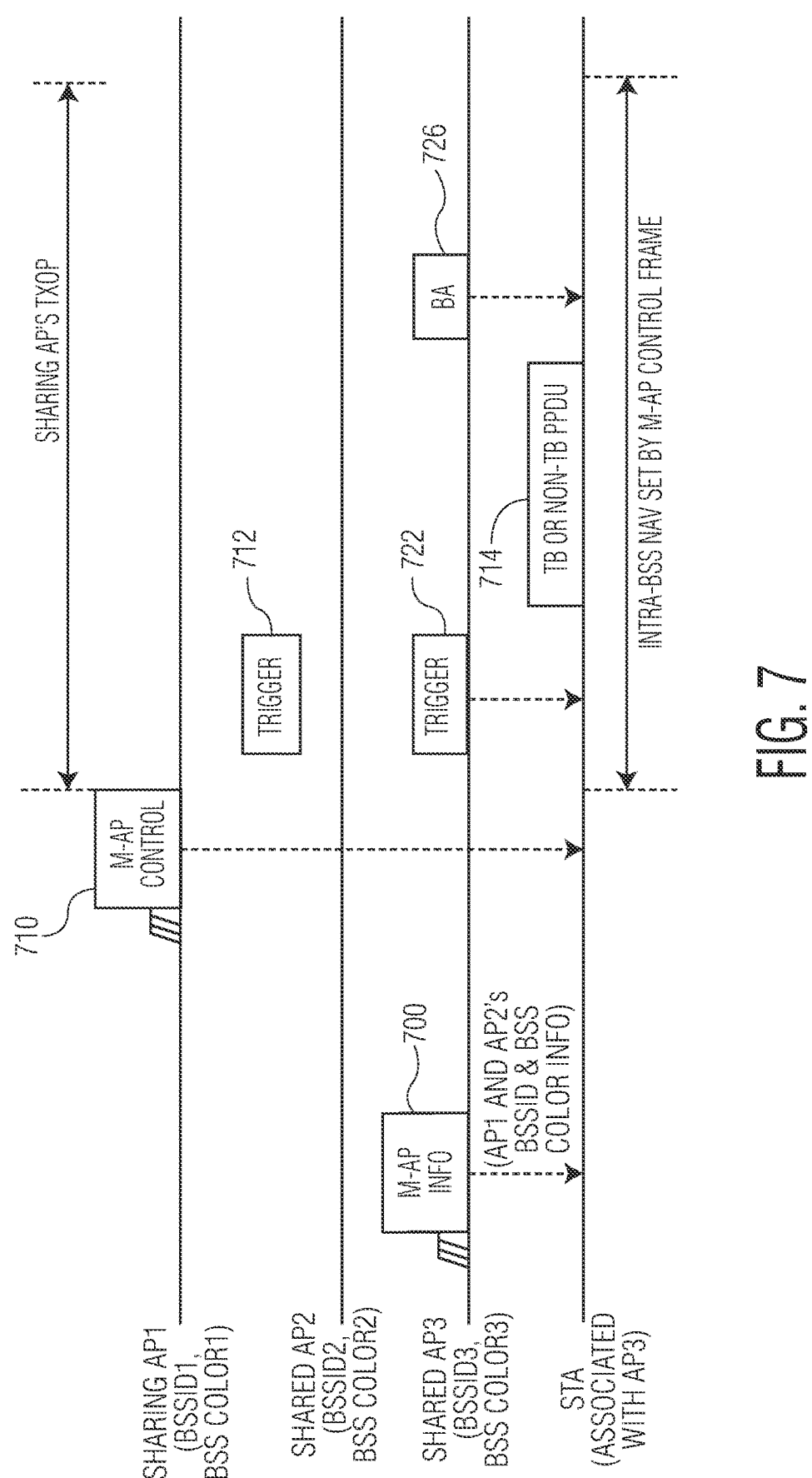
FIG. 7 depicts a frame exchange sequence diagram in a multi-AP coordination system.

FIG. 7 depicts a frame exchange sequence diagram in a
multi-AP coordination system. In the frame exchange
sequence diagram depicted in FIG. 7, the multi-AP coordi-
nation system involves a sharing AP (referred to as AP1)
with BSSID1 and BSS color 1, a shared AP (referred to as
AP2) with BSSID2 and BSS color 2, a shared AP (referred
to as AP3) with BSSID3 and BSS color 3, and a non-AP STA
that is associated with the shared AP3. In the multi-AP
coordination system, the sharing AP1 obtains a transmit
opportunity (TXOP) and initiates the multi-AP coordination,
and the shared AP2, AP3 are coordinated for the multi-AP
transmission by the sharing AP1. The sharing AP1 and/or the
shared AP2, AP3 may be implemented the same as or similar
to the wireless APs 102-1, . . . , 102-n depicted in FIG. 1,
while the non-AP STA may be implemented the same as or
similar to the non-AP STAs 106-1, . . . , 106-m depicted in
FIG. 1, respectively. In order to prevent a non-AP STA from not transmitting a TB PPDU due to a non-zero basic NAV set by a frame sent from a BSS belonging to the same multi-AP coordination group, the frame is identified at the non-AP STA as an intra-BSS PPDU. In the embodiment depicted in FIG. 7, different BSSID and BSS color are assigned to BSSs and APs belonging to the same multi-AP coordination group. A shared AP announces the BSSIDs and BSS colors of other APs belonging to the same multi-AP coordination group and a frame received from a BSS belonging to the same multi-AP coordination group is considered as an intra-BSS PPDU. An AP participating in multi-AP coordination may announce to associated non-AP STAs the information of the multi-AP coordination group, such as, the list of BSSID and BSS color for APs belonging to the same multi-AP coordination group. Upon receiving the information of the multi-AP coordination group, such as, the list of BSSID and BSS color for APs belonging to the same multi-AP coordination group, the non-AP STA may consider a frame received from a BSS belonging to the same multi-AP coordination group as an intra-BSS frame, and update the intra-BSS NAV timer of the non-AP STA, but not the basic NAV timer of the non-AP STA. The approach may need an additional control overhead for multi-AP group information signaling to non-AP STAs. However, it can support dynamic multi-AP group update. In the frame exchange sequence diagram depicted in FIG. 7, the shared AP3 announces to the associated non-AP STA the information of the multi-AP coordination group such as the list of BSSID and BSS color for APs belonging to the same multi-AP coordination group by transmitting a multiple-AP (M-AP) information frame 700, which may include BSSID and BSS color information of AP1 and AP2. Upon receiving the information, the non-AP STA may consider a frame received from any BSS belonging to the same multi-AP coordination group as an intra-BSS frame, and update the intra-BSS NAV timer of the non-AP STA, but not the basic NAV timer of the non-AP STA. The sharing AP1 obtains a TXOP and transmits a M-AP control frame 710 coordinating multi-AP transmission to the shared AP2, AP3 belonging to the same multi-AP coordination system or group. Upon receiving the frame, the shared AP2, AP3 perform multi-AP transmission using, such as, coordinated TDMA (C-TDMA), coordinated OFDMA (C-OFDMA), coordinated beamforming (C-BF) and/or joint transmission, etc. In the frame exchange sequence diagram depicted in FIG. 7, a trigger frame 712 may be sent by the shared AP2 to the non-AP STA and a trigger frame 722 may be sent by the shared AP3 to the non-AP STA. A TB or non-TB PPDU 714 may be sent by the non-AP STA, and a block acknowledgement (BA) 726 may be sent by the shared AP3.

Figure 8:
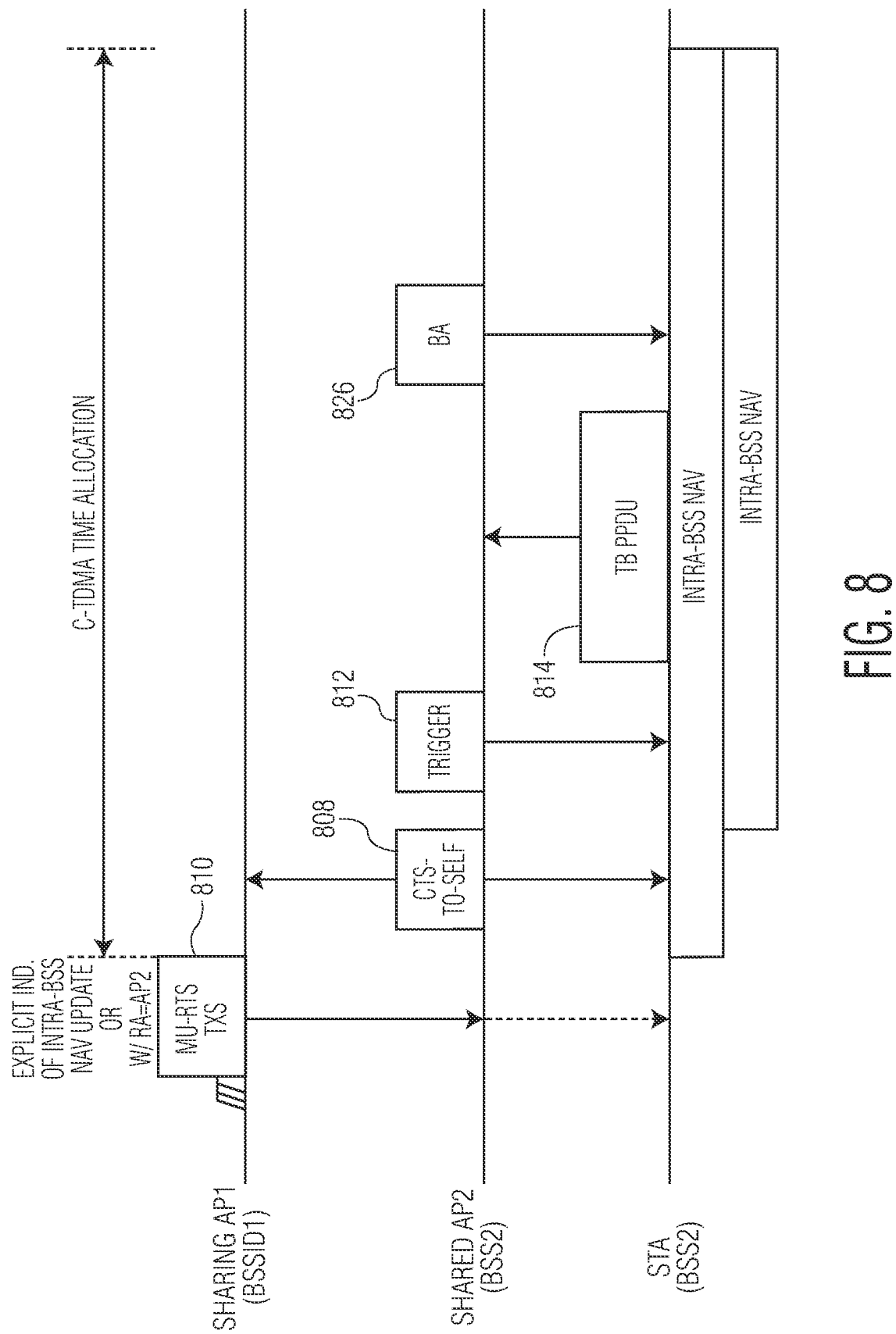
FIG. 8 depicts a frame exchange sequence diagram in a multi-AP coordination system.

FIG. 8 depicts a frame exchange sequence diagram in a multi-AP coordination system. In the frame exchange sequence diagram depicted in FIG. 8, the multi-AP coordination system involves a sharing AP (referred to as AP1) with BSSID1, a shared AP (referred to as AP2) with BSSID2, and a non-AP STA with BSSID2. In the multi-AP coordination system, the sharing AP1 initiates the multi-AP coordination, and the shared AP2 is coordinated for the multi-AP transmission by the sharing AP1. The sharing AP1 and/or the shared AP2 may be implemented the same as or similar to the wireless APs 102-1, . . . , 102-n depicted in FIG. 1, while the non-AP STA may be implemented same as or similar to the non-AP STAs 106-1, . . . , 106-m depicted in FIG. 1, respectively. In order to prevent a non-AP STA from not transmitting a TB PPDU due to a non-zero basic NAV set by a frame sent from a BSS belonging to the same multi-AP coordination group, the frame is identified at the non-AP STA as an intra-BSS PPDU. For multi-AP coordination operation (e.g., C-TDMA, C-OFDMA, coordinated spatial reuse (C-SR), C-BF, J-TX, etc.), a frame for multi-AP control (M-AP control) sent from a sharing AP to a shared AP may include an indication of intra-BSS NAV update upon reception of the M-AP Control frame. The indication of intra-BSS NAV update may be explicitly included in the M-AP control frame (e.g., a specific field/subfield of the M-AP control frame) or implicitly (e.g., a type field of the M-AP control frame or inclusion of the shared AP's MAC address in the RA field of the M-AP control frame). In some embodiments, if a non-AP STA receives the M-AP control frame, the non-AP STA updates the intra-BSS NAV even though the M-AP control frame is transmitted from other BSS. The M-AP control frame can be a modified Multi User Request to Send (MU-RTS) triggered TXOP sharing (TXS) trigger frame. The modified MU-RTS TXS Trigger frame can be transmitted in a non-High Throughput PPDU, a non-High Throughput (HT) duplicate PPDU or an Ultra High Reliability (UHR) PPDU. The receiver address (RA) field of the modified MU-RTS TXS Trigger frame can be set to the shared AP's MAC address. The modified MU-RTS TXS Trigger frame can invoke the intra-BSS NAV update of the non-AP STA that is associated with the shared AP. An immediate response frame (sent from a shared AP to a sharing AP) in response to the M-AP Control frame can be a CTS-to-self frame in which the RA field is set to the value of the transmitter's MAC address (e.g., shared AP). An immediate response frame (e.g., CTS-to-self frame) in response to the M-AP Control frame (e.g., modified MU-RTS TXS Trigger frame) can invoke the intra-BSS NAV update of the non-AP STA that is associated with the shared AP. The non-AP STA that receives a trigger frame from an associated AP (e.g., shared AP) may transmit a TB PPDU during the TXOP coordinated by the sharing AP when it does not have a non-zero value of the basic NAV timer. In the frame exchange sequence diagram depicted in FIG. 8, the sharing AP1 transmits a modified Multi User Request to Send (MU-RTS) TXS Trigger frame 810 to reserve the TXOP, and a portion of the TXOP can be shared with the shared AP2. Upon receiving the frame, the shared AP2 performs multi-AP transmission using, such as, coordinated TDMA (C-TDMA), coordinated OFDMA (C-OFDMA), coordinated beamforming (C-BF) and/or joint transmission, etc. In the frame exchange sequence diagram depicted in FIG. 8, the shared AP2 may transmit a Clear to Send (CTS)-to-self frame 808 in response to the modified MU-RTS TXS Trigger frame and the intra-BSS NAV of the non-AP STA is set. A trigger frame 812 may be sent by the shared AP2 to the non-AP STA. A TB or non-TB PPDU 814 may be sent by the non-AP STA, and a block acknowledgement (BA) 826 may be sent by the shared AP2.

Figure 9:
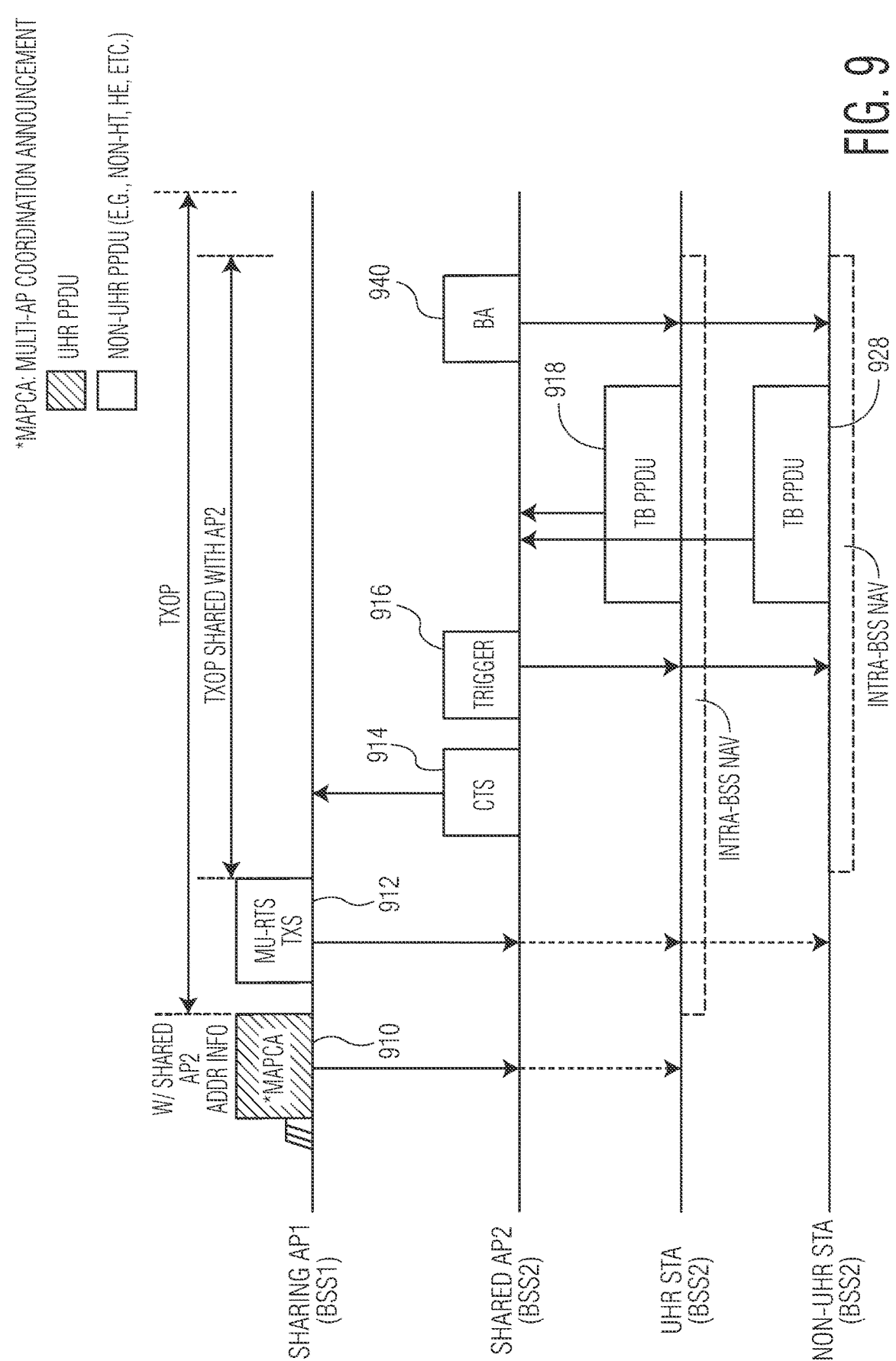
FIG. 9 depicts a frame exchange sequence diagram in a multi-AP coordination system.

FIG. 9 depicts a frame exchange sequence diagram in a multi-AP coordination system. In the frame exchange sequence diagram depicted in FIG. 9, the multi-AP coordination system involves a sharing AP (referred to as AP1) with BSSID1, a shared AP (referred to as AP2) with BSSID2, a UHR non-AP STA with BSSID2, and a non-UHR non-AP STA with BSSID2. In the multi-AP coordination system, the sharing AP1 initiates the multi-AP coordination, and the shared AP2 is coordinated for the multi-AP transmission by the sharing AP1. The sharing AP1 and/or the shared AP2 may be implemented the same as or similar to the wireless APs 102-1, . . . , 102-n depicted in FIG. 1, while the UHR STA and/or the non-UHR STA may be implemented the same as or similar to the non-AP STAs

106-1, . . . , 106-_m_ depicted in FIG. 1, respectively. In order to prevent a non-AP STA from not transmitting a TB PPDU due to a non-zero basic NAV set by a frame sent from a BSS belonging to the same multi-AP coordination group, the frame is identified at the non-AP STA as an intra-BSS PPDU. In the embodiment depicted in FIG. 9, the sharing AP may transmit a MAC control frame in a UHR PPDU to reserve a TXOP that is used for multi-AP coordination during the TXOP such that a non-UHR non-AP STA does not set its basic NAV upon receiving the MAC control frame. The MAC control frame may be a modified MU-RTS TXS Trigger frame that does not solicit a CTS frame, or a newly defined MAC control frame (e.g., multi-AP Coordination Announcement frame). The MAC control frame may include a shared AP's address/identifier information (e.g., BSS color, least significant bits of BSSID, etc.) to be shared frequency/time resource by the sharing AP during the TXOP. If the shared AP's address/identifier that is listed in the MAC control frame matches the AP's address/identifier that is associated with a UHR non-AP STA, the UHR non-AP STA classifies the received frame as an intra-BSS frame and it may set the intra-BSS NAV with the value of the Duration field in the MAC header or the TXOP field in the PHY header of the frame. The MAC control frame sent in the UHR PPDU may not invoke a non-UHR STA's basic NAV update since the non-UHR STA cannot decode the MAC control frame sent in the UHR PPDU. The MAC control frame sent in the UHR PPDU may include the BSS Color field set to 0 and/or the TXOP field set to 127 indicating no duration information in the PHY header such that a UHR non-AP STA does not set its basic NAV upon decoding not the MAC information but the PHY header of the UHR PPDU. The shared AP can trigger the UL PPDU transmission from both an UHR non-AP STA and a non-UHR non-AP STA during the shared TXOP. The MAC control frame for multi-AP coordination transmitted in the UHR PPDU can protect the entire TXOP and enable the sharing AP to share its TXOP with a shared AP.

In some embodiments, if a UHR non-AP STA receives the MAC control frame in a UHR PPDU by a sharing AP, the non-AP STA updates the intra-BSS NAV. The sharing AP may transmit a modified Multi User Request to Send (MU-RTS) triggered TXOP sharing (TXS) trigger frame to a shared AP to share the time and the frequency resource during a TXOP. The modified MU-RTS TXS Trigger frame can be transmitted in a non-High Throughput PPDU and/or a non-HT duplicate PPDU. The receiver address (RA) field of the modified MU-RTS TXS Trigger frame can be set to the shared AP's MAC address. The modified MU-RTS TXS Trigger frame can invoke the intra-BSS NAV update of the non-AP STA (e.g., a UHR non-AP STA and a non-UHR non-AP STA) that is associated with the shared AP. An immediate response frame (sent from a shared AP to a sharing AP) in response to the modified MU-RTS TXS Trigger frame can be a CTS-to-self frame in which the RA field is set to the value of the transmitter's MAC address (e.g., shared AP). An immediate response frame (e.g., CTS-to-self frame) in response to the modified MU-RTS TXS Trigger frame can invoke the intra-BSS NAV update of the non-AP STA (e.g., a UHR non-AP STA and a non-UHR non-AP STA) that is associated with the shared AP. In another embodiment, the modified MU-RTS TXS Trigger frame may include the RA field set to a broadcast address, the Duration field set to either 0 or a value indicating a SIFS plus a CTS transmission time, and the shared AP's identifier information (e.g., a BSS color or the least significant bits of the shared AP's MAC address, etc.) in the User Info field.

The immediate response frame in response to the modified MU-RTS TXS Trigger frame may be a CTS frame including both the RA field set to the sharing AP's MAC address and the Duration field set to 0. The non-AP STA (e.g., a UHR STA or a non-UHR non-AP STA) that receives a trigger frame from an associated AP (e.g., shared AP) may transmit a TB PPDU during the TXOP coordinated by the sharing AP when it does not have a non-zero value of the basic NAV timer. In the frame exchange sequence diagram depicted in FIG. 9, the sharing AP1 transmits a MAC control frame 910 to reserve the TXOP, and a portion of the TXOP can be shared with the shared AP2. The sharing AP1 transmits a modified MU-RTS TXS Trigger frame 912 to share its TXOP with the shared AP2 for multi-AP coordination. Upon receiving the modified MU-RTS TXS Trigger frame, the shared AP2 performs multi-AP transmission using, such as, coordinated TDMA (C-TDMA). In the frame exchange sequence diagram depicted in FIG. 9, the shared AP2 may transmit a Clear to Send (CTS)-to-self frame 914 in response to the MU-RTS TXS Trigger frame and the intra-BSS NAV of the non-AP STA is set. A trigger frame 916 may be sent by the shared AP2 to the UHR non-AP STA and/or the non-UHR non-AP STA. A TB or non-TB PPDU 918 or 928 may be sent by the UHR non-AP STA and/or the non-UHR non-AP STA, and a block acknowledgement (BA) 940 may be sent by the shared AP2.

Figure 10:
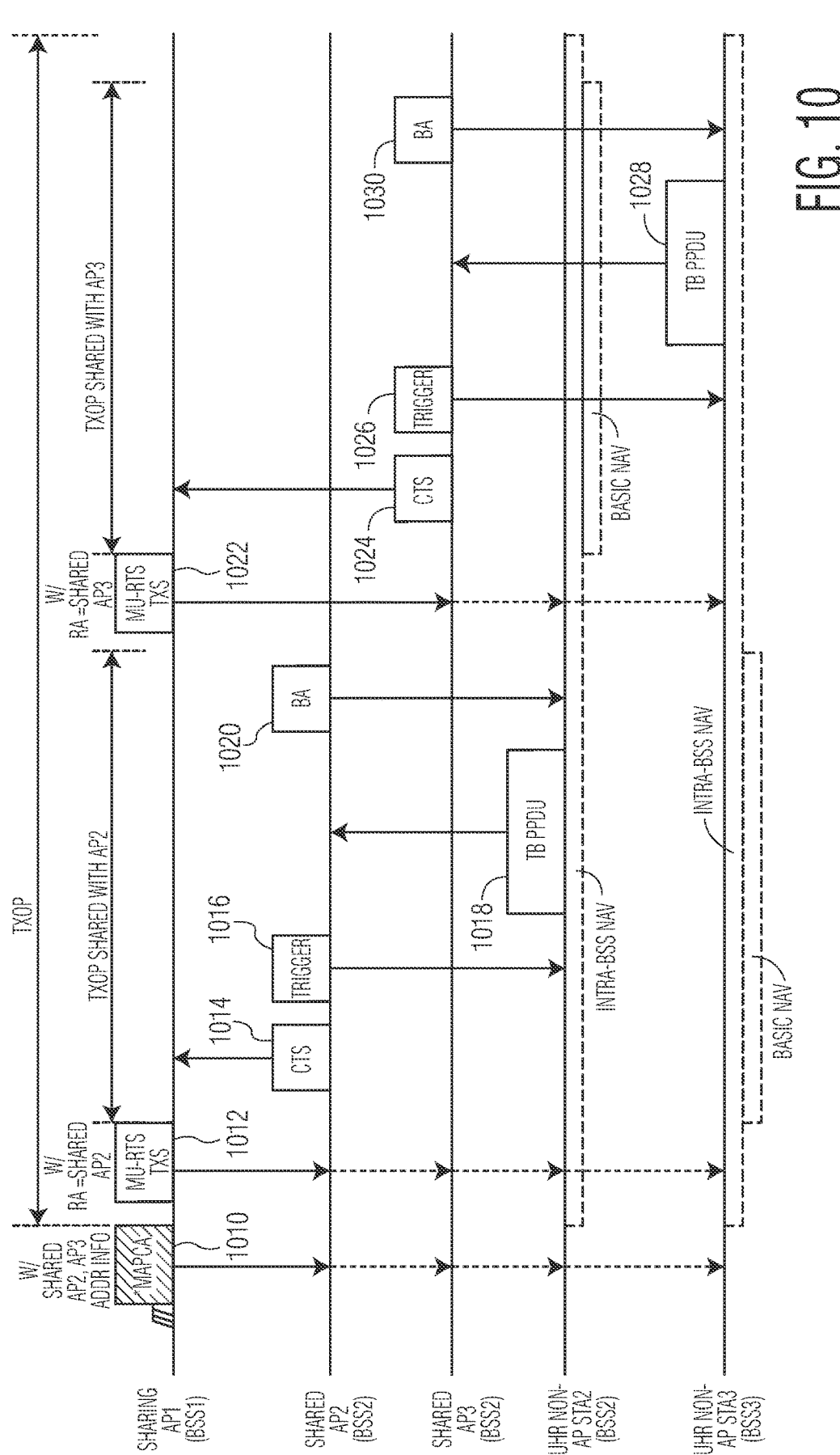
FIG. 10 depicts a frame exchange sequence diagram in a multi-AP coordination system.

FIG. 10 depicts a frame exchange sequence diagram in a multi-AP coordination system. In the frame exchange sequence diagram depicted in FIG. 10, the multi-AP coordination system involves a sharing AP (referred to as AP1) with BSSID1, a shared AP (referred to as AP2) with BSSID2, a shared AP (referred to as AP3) with BSSID3, a UHR non-AP STA with BSSID2 (referred to as STA2), and a UHR non-AP STA with BSSID3 (referred to as STA3). In the multi-AP coordination system, the sharing AP1 initiates the multi-AP coordination, and the shared AP2, AP3 are coordinated for the multi-AP transmission by the sharing AP1. The sharing AP1 and/or the shared AP2, AP3 may be implemented the same as or similar to the wireless APs 102-1, . . . , 102-_n_ depicted in FIG. 1, while the UHR non-AP STA2 and the UHR non-AP STA3 may be implemented the same as or similar to the non-AP STAs 106-1, . . . , 106-_m_ depicted in FIG. 1, respectively. In order to prevent a non-AP STA from not transmitting a TB PPDU due to a non-zero basic NAV set by a frame sent from the sharing AP1, the frame is identified at the non-AP STA as an intra-BSS PPDU. In the embodiment depicted in FIG. 10, the sharing AP may transmit a MAC control frame in a UHR PPDU to reserve a TXOP that is used for multi-AP coordination during the TXOP. The MAC control frame may be a modified MU-RTS TXS Trigger frame that does not solicit a CTS frame, or a newly defined MAC control frame (e.g., multi-AP Coordination Announcement frame). The MAC control frame may include more than one shared AP's addresses/identifiers information (e.g., BSS colors, least significant bits of BSSIDs, etc.) to be shared frequency/time resource by the sharing AP during the TXOP. If one of the shared AP's address/identifier that is listed in the MAC control frame matches the AP's address/identifier that is associated with a UHR non-AP STA, the UHR non-AP STA classifies the received frame as an intra-BSS frame and it may set the intra-BSS NAV with the value of the Duration field in the MAC header or the TXOP Duration field in the PHY header of the frame. The MAC control frame sent in the UHR PPDU may not invoke a non-UHR STA's basic NAV update since the non-UHR STA cannot decode the MAC control frame sent in the UHR PPDU. The MAC control frame sent in the UHR PPDU may include the BSS Color field set to 0 and/or the TXOP field set to 127 indicating no duration information in the PHY header such that a UHR non-AP STA does not set its basic NAV upon decoding not the MAC information but the PHY header of the UHR PPDU. The shared AP can trigger the UL PPDU transmission from one or more non-AP STAs during the shared TXOP. The MAC control frame for multi-AP coordination transmitted in the UHR PPDU can protect the entire TXOP and enable the sharing AP to share its TXOP with more than one shared APs.

In the frame exchange sequence diagram depicted in FIG. 10, the sharing AP1 transmits a MAC control frame 1010 to reserve the TXOP, and a portion of the TXOP can be shared with the shared AP2 and the shared AP3. The sharing AP1 transmits a modified MU-RTS TXS Trigger frame 1012 to share its TXOP with the shared AP2 for multi-AP coordination. Upon receiving the modified MU-RTS TXS Trigger frame 1012, the shared AP2 performs multi-AP transmission using, such as, coordinated TDMA (C-TDMA). In the frame exchange sequence diagram depicted in FIG. 10, the shared AP2 may transmit a Clear to Send (CTS)-to-self frame 1014 in response to the MU-RTS TXS Trigger frame and the intra-BSS NAV of the non-AP STA is set. When a non-AP STA (e.g., UHR non-AP STA3) that is not associated with the shared AP2 receives the modified MU-RTS TXS Trigger frame 1012 or the CTS-to-self frame 1014, the non-AP STA may set the basic NAV to the value indicated in the Duration field for the modified MU-RTS TXS Trigger frame 1012 or the CTS-to-self frame 1014. A trigger frame 1016 may be sent by the shared AP2 to the non-AP STA2 that is associated with the shared AP2. A TB or non-TB PPDU 1018 may be sent by the non-AP STA2, and a block acknowledgement (BA) 1020 may be sent by the shared AP2. Once the portion of the TXOP shared with the AP2 ends or the shared TXOP is returned to the sharing AP1, the sharing AP1 may transmit another modified MU-RTS TXS Trigger frame 1022 to share its TXOP with the shared AP3 for multi-AP coordination. Upon receiving the modified MU-RTS TXS Trigger frame 1022, the shared AP3 performs multi-AP transmission using, such as, coordinated TDMA (C-TDMA). In the frame exchange sequence diagram depicted in FIG. 10, the shared AP3 may transmit a Clear to Send (CTS)-to-self frame 1024 in response to the MU-RTS TXS Trigger frame 1022 and the intra-BSS NAV of the non-AP STA is set. When a non-AP STA (e.g., the UHR non-AP STA2) that is not associated with the shared AP3 receives the modified MU-RTS TXS Trigger frame 1022 or the CTS-to-self frame 1024, the non-AP STA may set the basic NAV to the value indicated in the Duration field for the modified MU-RTS TXS Trigger frame 1022 or the CTS-to-self frame 1024. A trigger frame 1026 may be sent by the shared AP3 to the non-AP STA (e.g., the UHR non-AP STA3) that is associated with the shared AP3. A TB or non-TB PPDU 1028 may be sent by the non-AP STA, and a block acknowledgement (BA) 1030 may be sent by the shared AP3.

Figure 11:
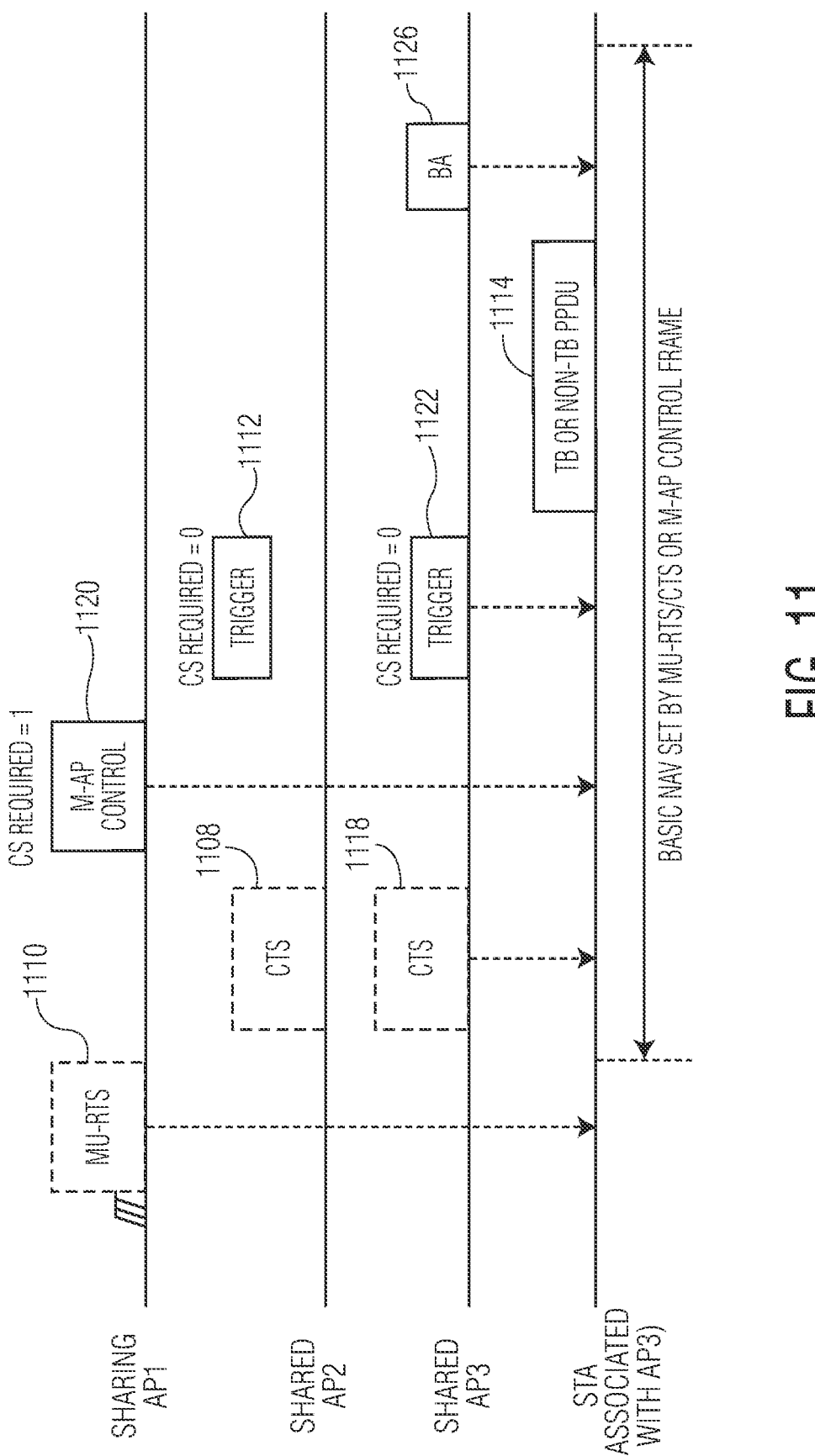
FIG. 11 depicts a frame exchange sequence diagram in a multi-AP coordination system.

FIG. 11 depicts a frame exchange sequence diagram in a multi-AP coordination system. In the frame exchange sequence diagram depicted in FIG. 11, the multi-AP coordination system involves a sharing AP (referred to as AP1), a shared AP (referred to as AP2), a shared AP (referred to as AP3), and a non-AP STA that is associated with the shared AP3. In the multi-AP coordination system, the sharing AP1 initiates the multi-AP coordination, and the shared AP2, AP3 are coordinated for the multi-AP transmission by the sharing AP1. The sharing AP1 and/or the shared AP2, AP3 may be implemented the same as or similar to the wireless APs 102-1, . . . , 102-n depicted in FIG. 1, while the non-AP STA may be implemented the same as or similar to the non-AP STAs 106-1, . . . , 106-m depicted in FIG. 1, respectively. In order to prevent a non-AP STA from not transmitting a TB PPDU due to a non-zero basic NAV set by a frame sent from a BSS belonging to the same multi-AP coordination group, the non-zero basic NAV is ignored at the non-AP STA during multi-AP coordinated transmission. In the embodiment depicted in FIG. 11, the CS required subfield being set to 0 in a trigger frame (indicating RU allocation to non-AP STA) during multi-AP coordinated transmission. Multi-AP control frame (e.g., a type of trigger frame) that is sent by a sharing AP may set the CS required subfield to 1, in which it triggers a trigger frame transmission from one or more shared APs for multi-AP coordinated transmission (e.g., UL C-OFDMA). In the frame exchange sequence diagram depicted in FIG. 11, the sharing AP1 may protect the TXOP related to multi-AP coordinated transmission by exchanging MU-RTS/CTS frame 1110 with one or more shared AP2, AP3 before transmission of a multi-AP control frame 1120. CTS frames or message 1108, 1118 may be sent by the shared AP2, AP3. Trigger frames 1112, 1122 that are sent by the shared AP2, AP3 set the CS Required subfield to 0. Upon receiving the trigger frame 1122 from its associated AP (e.g., the shared AP3), the non-AP STA may transmit a TB or non-TB PPDU 1114 in response to the trigger frame 1122 with the CS required subfield set to 0 even though the non-AP STA has a non-zero basic NAV value set by the multi-AP control frame (or MU-RTS) received from the sharing AP1. A block acknowledgement (BA) 1126 may be sent by the shared AP3.

Figure 12:
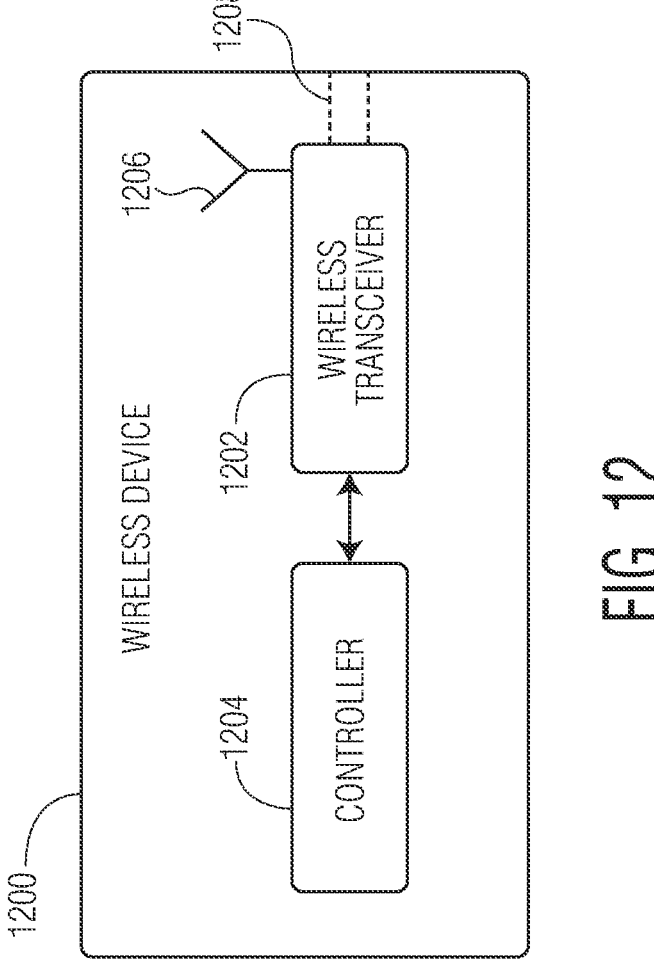
FIG. 12 depicts a wireless device in accordance with an embodiment of the invention.

FIG. 12 depicts a wireless device 1200 in accordance with an embodiment of the invention. The wireless device 1200 can be used in the multi-AP coordination system 100 depicted in FIG. 1. For example, the wireless device 1200 may be an embodiment of the wireless APs 102-1, . . . , 102-n and/or the non-AP STAs 106-1, . . . , 106-m depicted in FIG. 1. However, the wireless APs 102-1, . . . , 102-n and/or the non-AP STAs 106-1, . . . , 106-m depicted in FIG. 1 are not limited to the embodiment depicted in FIG. 12.

In the embodiment depicted in FIG. 12, the wireless device 1200 includes a wireless transceiver 1202, a controller 1204 operably connected to the wireless transceiver, and at least one antenna 1206 operably connected to the wireless transceiver. In some embodiments, the wireless device 1200 may include at least one optional network port 1208 operably connected to the wireless transceiver. In some embodiments, the wireless transceiver includes a physical layer (PHY) device. The wireless transceiver may be any suitable type of wireless transceiver. For example, the wireless transceiver may be a LAN transceiver (e.g., a transceiver compatible with an IEEE 802.11 protocol). In some embodiments, the wireless device 1200 includes multiple transceivers. The controller may be configured to control the wireless transceiver to process packets received through the antenna and/or the network port and/or to generate outgoing packets to be transmitted through the antenna and/or the network port. In some embodiments, the controller is implemented within a processor, such as a microcontroller, a host processor, a host, a DSP, or a CPU. The antenna may be any suitable type of antenna. For example, the antenna may be an induction type antenna such as a loop antenna or any other suitable type of induction type antenna. However, the antenna is not limited to an induction type antenna. The network port may be any suitable type of port. In some embodiments, the wireless device is compatible with an Institute of Electrical and Electronics Engineers (IEEE)

802.11 protocol. In some embodiments, the wireless device is a component of a multi-link device (MLD).

The wireless device 1200 may be a non-AP station (STA) device. In accordance with an embodiment of the invention, the wireless transceiver 1202 is configured to receive a first frame from a first wireless access point (AP) for multi-AP coordination that is not associated with the wireless device and a second frame from a second wireless AP for multi-AP coordination that is associated with the wireless device, and the controller 1204 is configured to set a network allocation vector (NAV) timer of the wireless device to a non-zero value in response to the first frame and the second frame. The wireless transceiver is further configured to transmit a PPDU to the second wireless AP even if the NAV timer of the wireless device is non-zero. In some embodiments, the PPDU includes a trigger based (TB) PPDU. In some embodiments, the PPDU includes a non-TB PPDU. In some embodiments, the second wireless AP shares a transmit opportunity (TXOP) of the first wireless AP. In some embodiments, the controller is further configured to identify the first frame as an intra-basic service set (BSS) PPDU and to update an intra-BSS NAV timer of the wireless device in response to the intra-BSS PPDU. In some embodiments, the first wireless AP, the second wireless AP, and the wireless device belong to the same BSS. In some embodiments, the first wireless AP and the wireless device belong to different BSSs, and where the second wireless AP and the wireless device belong to the same BSS. In some embodiments, the wireless transceiver is further configured to receive BSS information of wireless APs of the multi-AP coordination group. In some embodiments, the first frame includes a multi-AP control frame that includes an indication of intra-BSS NAV timer update of the wireless device upon reception of the multi-AP control frame. In some embodiments, the multi-AP control frame includes a Multi User Request to Send (MU-RTS) triggered TXOP sharing (TXS) frame. In some embodiments, the second frame includes a trigger frame that contains a carrier sense (CS) required subfield that is set to zero. In some embodiments, the wireless device is compatible with an Institute of Electrical and Electronics Engineers (IEEE) 802.11 protocol.

FIG. 13 is a process flow diagram of a method for wireless communications in accordance with an embodiment of the invention. At block 1302, at a wireless device, a first frame from a first wireless access point (AP) for multi-AP coordination that is not associated with the wireless device and a second frame from a second wireless AP for multi-AP coordination that is associated with the wireless device are received. At block 1304, at the wireless device, a network allocation vector (NAV) timer of the wireless device is set to a non-zero value in response to the first frame and the second frame. At block 1306, at the wireless device, a PPDU is transmitted to the second wireless AP even if the NAV timer of the wireless device is non-zero. In some embodiments, the PPDU includes a trigger based (TB) PPDU. In some embodiments, the PPDU includes a non-TB PPDU. In some embodiments, the second wireless AP shares a transmit opportunity (TXOP) of the first wireless AP. In some embodiments, the wireless device is a non-AP STA device. In some embodiments, the first frame is identified as an intra-basic service set (BSS) PPDU and to update an intra-BSS NAV timer of the wireless device in response to the intra-BSS PPDU. In some embodiments, the first wireless AP and the second wireless AP belong to the same BSS. In some embodiments, the first wireless AP and the second wireless AP wireless device belong to different BSSs. In some embodiments, BSS information of wireless APs of the multi-AP coordination group is received. In some embodiments, the first frame includes a multi-AP control frame that includes an indication of intra-BSS NAV timer update upon reception of the multi-AP control frame. In some embodiments, the multi-AP control frame includes a Multi User Request to Send (MU-RTS) triggered TXOP sharing (TXS) frame. In some embodiments, the second frame includes a trigger frame that contains a carrier sense (CS) required subfield that is set to zero. The first wireless AP and/or the second wireless AP may be the same as or similar to the wireless APs 102-1, . . . , 102-n depicted in FIG. 1.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A wireless device comprising:
   a wireless transceiver configured to receive a first frame from a first wireless access point (AP) for multi-AP coordination that is not associated with the wireless device and a second frame from a second wireless AP for multi-AP coordination that is associated with the wireless device; and
   a controller configured to set a network allocation vector (NAV) timer of the wireless device to a non-zero value in response to the first frame and the second frame,
   wherein the wireless transceiver is further configured to transmit a physical protocol data unit (PPDU) to the second wireless AP.

2. The wireless device of claim 1, wherein the PPDU comprises a trigger based (TB) PPDU.

3. The wireless device of claim 1, wherein the PPDU comprises a non-trigger based (TB) PPDU.

4. The wireless device of claim 1, wherein the wireless device comprises a non-AP station (STA) device.

5. The wireless device of claim 1, wherein the second wireless AP shares a transmit opportunity (TXOP) of the first wireless AP.

6. The wireless device of claim 5, wherein the controller is further configured to identify the first frame as an intra-basic service set (BSS) PPDU and to update an intra-BSS NAV timer of the wireless device in response to the intra-BSS PPDU.

7. The wireless device of claim 6, wherein the first wireless AP, the second wireless AP, and the wireless device belong to the same BSS.

8. The wireless device of claim 6, wherein the first wireless AP and the wireless device belong to different BSSs, and wherein the second wireless AP and the wireless device belong to the same BSS.

9. The wireless device of claim 8, wherein the wireless transceiver is further configured to receive BSS information of a plurality of wireless APs for multi-AP coordination.

10. The wireless device of claim 8, wherein the first frame comprises a multi-AP control frame that includes an indication of intra-BSS NAV timer update of the wireless device upon reception of the multi-AP control frame.

11. The wireless device of claim 10, wherein the multi-AP control frame comprises a Multi User Request to Send (MU-RTS) triggered TXOP sharing (TXS) frame.

12. The wireless device of claim 5, wherein the second frame comprises a trigger frame that contains a carrier sense (CS) required subfield that is set to zero.

13. A method for wireless communications, comprising:
  receiving a first frame from a first wireless access point (AP) for multi-AP coordination that is not associated with the wireless device and a second frame from a second wireless AP for multi-AP coordination that is associated with the wireless device;

setting a network allocation vector (NAV) timer of the wireless device to a non-zero value in response to the first frame and the second frame; and
  transmitting a physical protocol data unit (PPDU) to the second wireless AP.

14. The method of claim 13, wherein the PPDU comprises a trigger based (TB) PPDU.

15. The method of claim 13, wherein the PPDU comprises a non-trigger based (TB) PPDU.

16. The method of claim 13, wherein the second wireless AP shares a transmit opportunity (TXOP) of the first wireless AP.

17. The method of claim 16, further comprising identifying the first frame as an intra-basic service set (BSS) PPDU and updating an intra-BSS NAV timer of the wireless device in response to the intra-BSS PPDU.

18. The method of claim 17, wherein the first wireless AP and the second wireless AP belong to different BSSs.

19. A non-access point (AP) station (STA) device, the non-AP STA device comprising:
  a wireless transceiver configured to receive a first frame from a first wireless AP for multi-AP coordination that is not associated with the non-AP STA device and a second frame from a second wireless AP for multi-AP coordination that is associated with the non-AP STA device, wherein the second wireless AP shares a transmit opportunity (TXOP) of the first wireless AP; and
  a controller configured to set a network allocation vector (NAV) timer of the non-AP STA device to a non-zero value in response to the first frame and the second frame,
wherein the wireless transceiver is further configured to transmit a trigger based (TB) physical protocol data unit (PPDU) to the second wireless AP.

* * * * *